(12) United States Patent
Schroeder et al.

(10) Patent No.: US 11,554,866 B2
(45) Date of Patent: Jan. 17, 2023

(54) LINE REPLACEABLE CENTERBODY ASSEMBLIES FOR DUCTED PROPULSION

(71) Applicant: Textron Innovations Inc., Providence, RI (US)

(72) Inventors: Karl Hugo Schroeder, Southlake, TX (US); Joseph R. Carpenter, Jr., Burleson, TX (US)

(73) Assignee: Textron Innovations Inc., Providence, RI (US)

( * ) Notice: Subject to any disclaimer, the term of this patent is extended or adjusted under 35 U.S.C. 154(b) by 145 days.

(21) Appl. No.: 17/199,216

(22) Filed: Mar. 11, 2021

(65) Prior Publication Data

US 2022/0289371 A1 Sep. 15, 2022

(51) Int. Cl.
| | | |
|---|---|---|
| *B64C 29/00* | (2006.01) | |
| *B64D 27/24* | (2006.01) | |
| *B64D 35/02* | (2006.01) | |
| *B64C 11/00* | (2006.01) | |
| *B64D 41/00* | (2006.01) | |
| *B60L 50/60* | (2019.01) | |
| *B60L 15/20* | (2006.01) | |
| *B64D 31/00* | (2006.01) | |

(52) U.S. Cl.
CPC .......... *B64C 29/0033* (2013.01); *B60L 15/20* (2013.01); *B60L 50/60* (2019.02); *B64C 11/001* (2013.01); *B64D 27/24* (2013.01); *B64D 31/00* (2013.01); *B64D 35/02* (2013.01); *B64D 41/00* (2013.01); *B60L 2200/10* (2013.01); *B64C 2211/00* (2013.01)

(58) Field of Classification Search
CPC .... B64C 29/0033; B64C 11/001; B64D 24/27
See application file for complete search history.

(56) References Cited

U.S. PATENT DOCUMENTS

| | | | |
|---|---|---|---|
| 2016/0236790 A1* | 8/2016 | Knapp | G01C 21/20 |
| 2019/0312439 A1* | 10/2019 | Cottrell | B64D 31/14 |
| 2019/0344899 A1* | 11/2019 | Harvey | B64D 27/24 |
| 2019/0344900 A1* | 11/2019 | Harvey | B64D 27/24 |
| 2020/0070988 A1* | 3/2020 | Harvey | F02C 3/067 |
| 2020/0070990 A1* | 3/2020 | Harvey | B64C 11/48 |
| 2020/0195065 A1* | 6/2020 | Hennig | H02K 9/02 |
| 2021/0094674 A1* | 4/2021 | Thompson | B64C 27/14 |
| 2021/0276707 A1* | 9/2021 | Heironimus | B64D 33/08 |

* cited by examiner

*Primary Examiner* — Timothy D Collins
*Assistant Examiner* — Justin Michael Heston
(74) *Attorney, Agent, or Firm* — Lawrence Youst PLLC

(57) ABSTRACT

A ducted propulsion assembly for an aircraft includes a duct and a plurality of stators. The distal ends of the stators are coupled to the duct. The ducted propulsion assembly includes a line replaceable centerbody assembly isostatically coupled to the proximal ends of the stators. The line replaceable centerbody assembly includes one or more electric motors driving an output driveshaft. The ducted propulsion assembly also includes a proprotor assembly interchangeably coupled to and rotatable with the output driveshaft of the line replaceable centerbody assembly. The proprotor assembly is rotatable in a rotational plane to generate thrust.

20 Claims, 15 Drawing Sheets

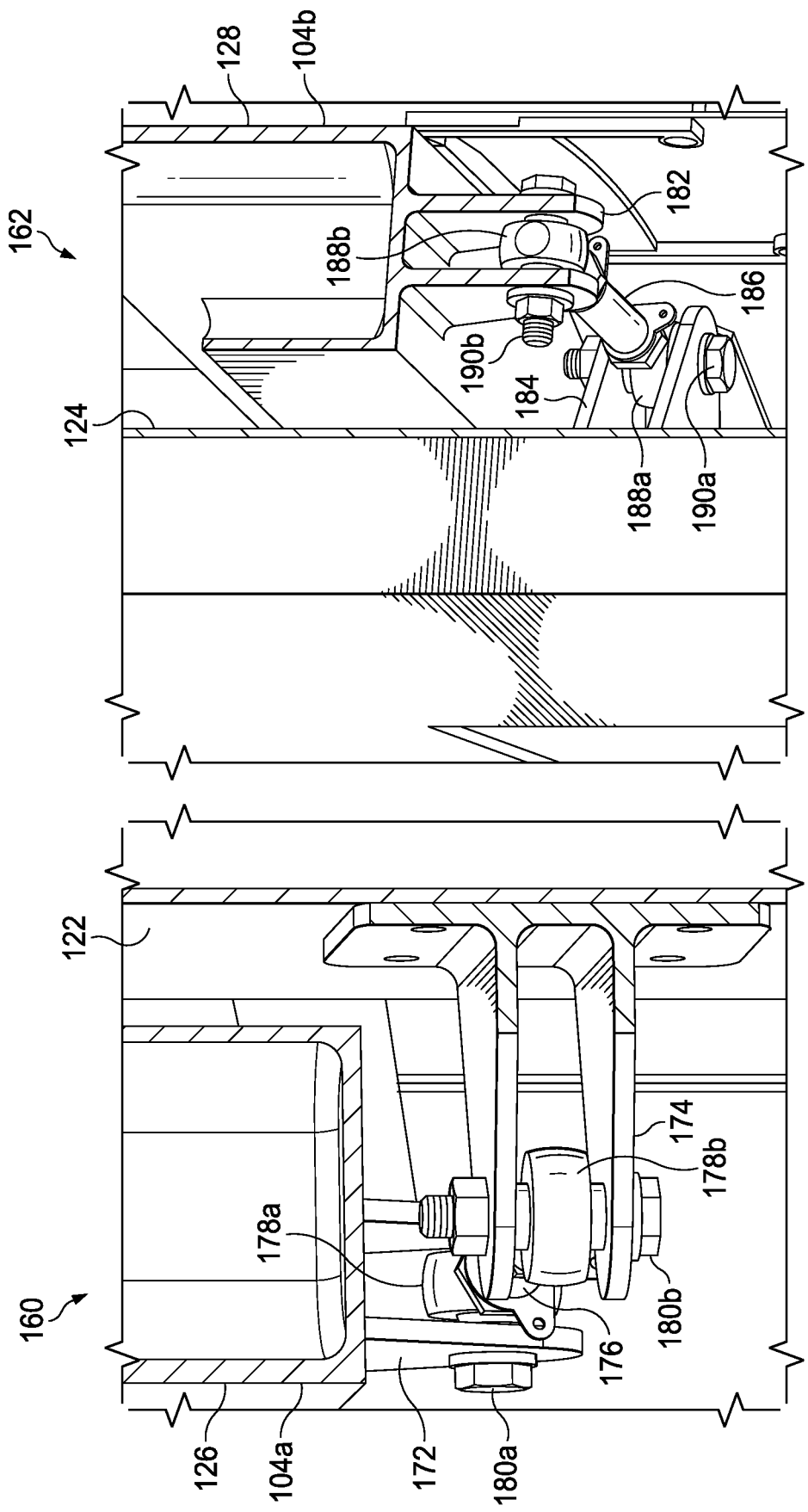

LINE REPLACEABLE CENTERBODY ASSEMBLIES FOR DUCTED PROPULSION

TECHNICAL FIELD OF THE DISCLOSURE

The present disclosure relates, in general, to aircraft having ducted propulsion assemblies and, in particular, to line replaceable centerbody assemblies for ducted propulsion assemblies configured for rapid in-situ installation on aircraft.

BACKGROUND

Ducted rotor systems offer several benefits over open rotor systems in which rotor blades are exposed. For example, ducted rotor systems emit less noise and are therefore preferred when a reduced noise environment is desired, such as during air reconnaissance, clandestine operations or flight in urban airspace. Ducts increase safety for ground personnel and crew by preventing contact with an operating rotor. Openly exposed rotors can lead to blade tip thrust losses during flight. By reducing rotor blade tip losses, a ducted rotor system is more efficient in producing thrust than an open rotor system of similar diameter, especially at low speed and high static thrust levels. Also, the thrust vectoring capabilities of open rotor systems are limited as is the use of pressure differentials to augment thrust. Ducted propulsion systems that utilize proprotors may be implemented on aircraft that convert between a vertical takeoff and landing (VTOL) flight mode in which the ducted propulsion system is in a generally horizontal orientation and provides thrust-borne lift and a forward flight mode in which the ducted propulsion system is in a generally vertical orientation and provides forward thrust to enable wing-borne lift.

At the center of a ducted propulsion system is a permanently affixed centerbody assembly that may house several systems and components that are critical to the operation of the ducted propulsion system. The rotor or proprotor assembly of the ducted propulsion system may also be coupled to the centerbody assembly. Over time, the systems and components housed in the centerbody assembly deteriorate or fail. The maintenance and repair of such systems and components in previously implemented centerbody assemblies is both expensive and labor-intensive because previous centerbody assemblies must be repaired while the centerbody assembly is installed on the aircraft. Maintenance of previous centerbody assemblies must also be performed at facilities capable of housing entire aircraft since previous centerbody assemblies are permanently affixed thereto. The systems and components in previous centerbody assemblies may also be difficult to access by technicians while the centerbody assembly is attached to a ducted propulsion system. Accordingly, a need has arisen for improved centerbody assemblies that can be interchanged in a ducted propulsion system to allow for easier access, repair and maintenance of the systems and components included in the centerbody assemblies.

SUMMARY

In a first aspect, the present disclosure is directed to a ducted propulsion assembly for an aircraft including a duct and a plurality of stators. The distal ends of the stators are coupled to the duct. The ducted propulsion assembly includes a line replaceable centerbody assembly isostatically coupled to the proximal ends of the stators. The line replaceable centerbody assembly includes one or more electric motors driving an output driveshaft. The ducted propulsion assembly also includes a proprotor assembly interchangeably coupled to and rotatable with the output driveshaft of the line replaceable centerbody assembly. The proprotor assembly is rotatable in a rotational plane to generate thrust.

In some embodiments, the line replaceable centerbody assembly may include a gearbox interposed between the output driveshaft and the one or more electric motors, the gearbox receiving rotational energy from the one or more electric motors via a motor driveshaft. In certain embodiments, the gearbox may include a planetary gear system coaxial with the one or more electric motors. In some embodiments, the line replaceable centerbody assembly may include a blower fan configured to cool the one or more electric motors. In certain embodiments, the blower fan may be coaxial with the one or more electric motors and receive rotational energy from the one or more electric motors via a motor driveshaft. In some embodiments, the line replaceable centerbody assembly may include an oil management system including a heat exchanger and/or an oil filter. In certain embodiments, the line replaceable centerbody assembly may include an instrumentation and controller unit including one or more controllers. In some embodiments, the instrumentation and controller unit may include a speed controller, the one or more electric motors configured to rotate at a rotational speed responsive to the speed controller. In certain embodiments, the line replaceable centerbody assembly may include a plurality of support rails, the line replaceable centerbody assembly coupled to the proximal ends of the stators via the support rails. In some embodiments, the line replaceable centerbody assembly may include a gearbox, a blower fan, a pitch actuator and a heat exchanger. In such embodiments, the one or more electric motors, the gearbox, the blower fan, the pitch actuator and the heat exchanger may be interposed between the support rails. In certain embodiments, the aircraft may include a wing and the ducted propulsion assembly may be rotatably coupled to the wing via a spindle. In such embodiments, the support rails may include inboard and outboard support rails collinear with the spindle.

In some embodiments, the support rails may have leading ends including end stop fittings configured to couple to the proximal ends of the stators, thereby preventing the line replaceable centerbody assembly from falling through the duct. In certain embodiments, the proximal end of each stator may include an end cap, the end caps each including a leading mounting lug. In such embodiments, the end stop fittings of the support rails may be removably coupled to the leading mounting lugs of the end caps of the stators via one or more fasteners and one or more spherical bearings to form leading connections between the line replaceable centerbody assembly and the stators. In some embodiments, the leading mounting lugs may be opposing leading mounting lugs on opposite sides of the line replaceable centerbody assembly. The opposing leading mounting lugs may be orthogonally oriented relative to one another. In certain embodiments, the proximal end of each stator may include an end cap, the end caps each including a trailing mounting lug. In such embodiments, the support rails may have trailing portions including trailing mounting lugs. Also in such embodiments, the trailing mounting lugs of the support rails may be removably coupled to the trailing mounting lugs of the end caps of the stators via one or more links and one or more spherical bearings to form trailing connections between the line replaceable centerbody assembly and the stators. In some embodiments, the proprotor assembly may include a plurality of proprotor blades having variable pitch. In such embodiments, the line replaceable centerbody assembly may include a pitch actuator configured to couple to the proprotor blades and control the pitch of the proprotor blades. In certain embodiments, the proximal ends of the stators may include interconnected end caps forming a cylindrical centerbody support frame, the line replaceable centerbody assembly interchangeably coupled to the proximal ends of the stators via the centerbody support frame. In some embodiments, the one or more electric motors may be a stacked motor assembly including a plurality of electric motors.

In a second aspect, the present disclosure is directed to an aircraft including a fuselage and a plurality of ducted propulsion assemblies rotatably coupled to the fuselage between a generally horizontal orientation in a vertical takeoff and landing flight mode and a generally vertical orientation in a forward flight mode. Each ducted propulsion assembly includes a duct and a plurality of stators. The distal ends of the stators are coupled to the duct. Each ducted propulsion assembly includes a line replaceable centerbody assembly isostatically coupled to the proximal ends of the stators. The line replaceable centerbody assembly includes one or more electric motors driving an output driveshaft. Each ducted propulsion assembly also includes a proprotor assembly interchangeably coupled to and rotatable with the output driveshaft of the line replaceable centerbody assembly. The proprotor assembly is rotatable in a rotational plane to generate thrust.

In some embodiments, the stators may include slanted stators tapering from increasing to decreasing chord length from the distal ends of the stators to the proximal ends of the stators. In certain embodiments, the line replaceable centerbody assemblies may be interchangeably coupled to the stators. In some embodiments, the aircraft may include one or more batteries configured to supply power to the line replaceable centerbody assemblies. In such embodiments, the line replaceable centerbody assemblies may each include a rapid electrical connection interface configured to transmit power from the one or more batteries.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 6A-6D are isometric views of a rapid mechanical connection interface for a line replaceable centerbody assembly in accordance with embodiments of the present disclosure.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1A:
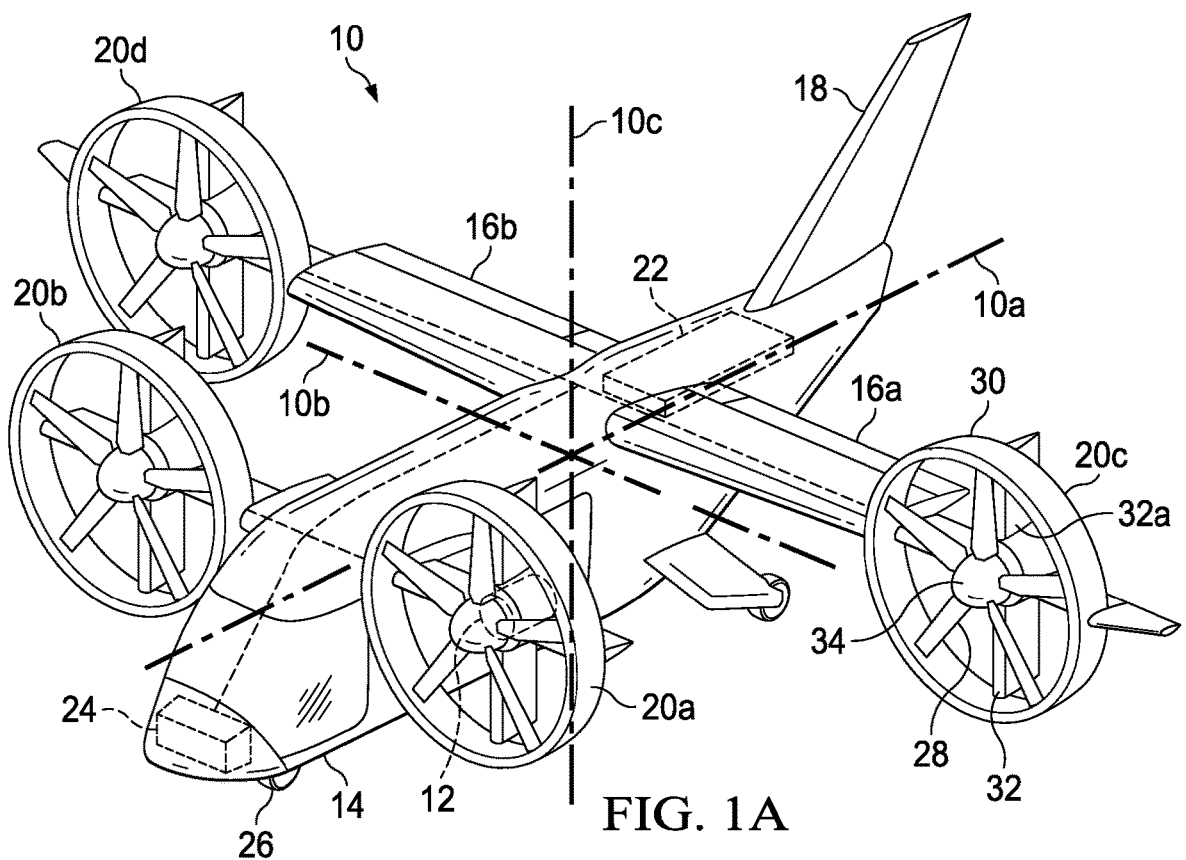
FIGS. 1A-1F are schematic illustrations of an aircraft having ducted propulsion assemblies configured for use with line replaceable centerbody assemblies in accordance with embodiments of the present disclosure.
Figure 1B:
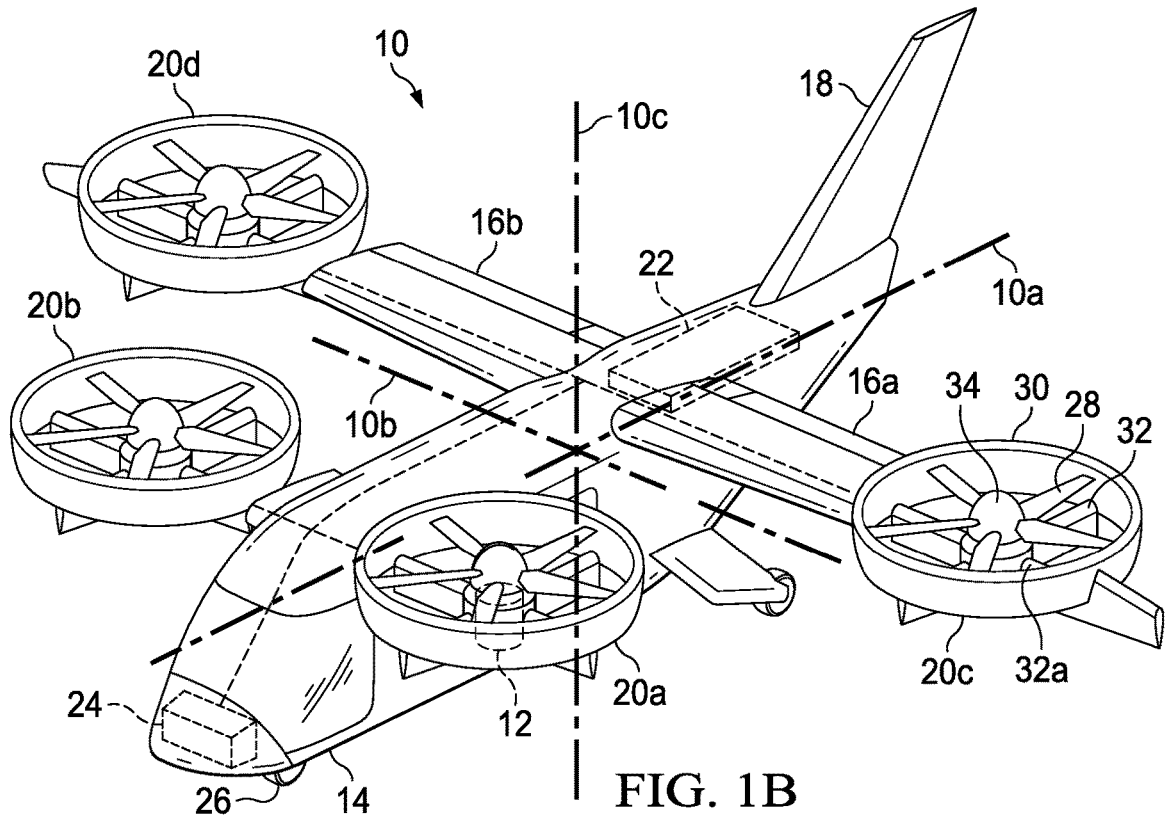
Figure 1C:
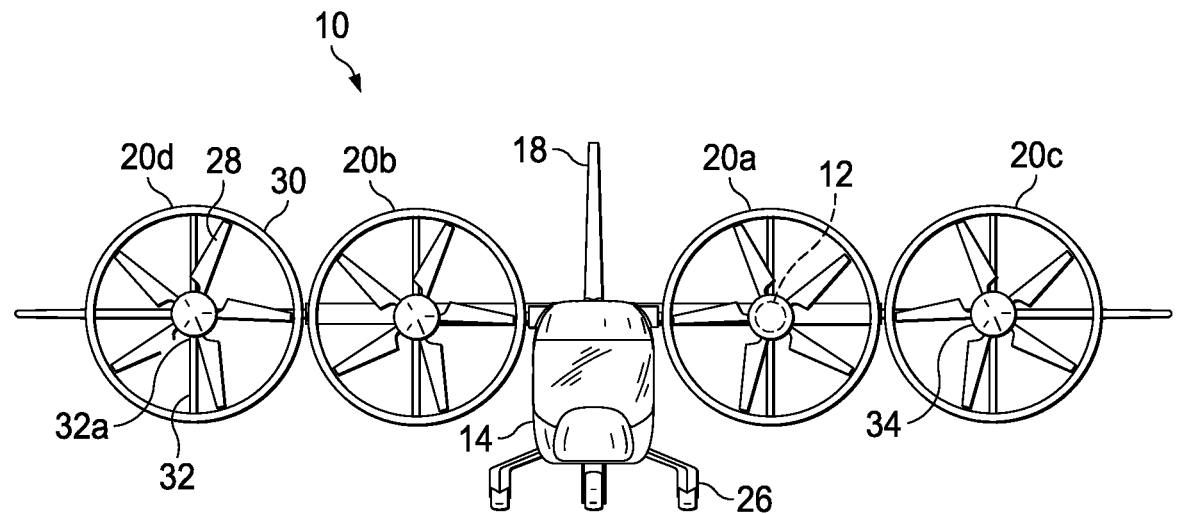
Figure 1D:
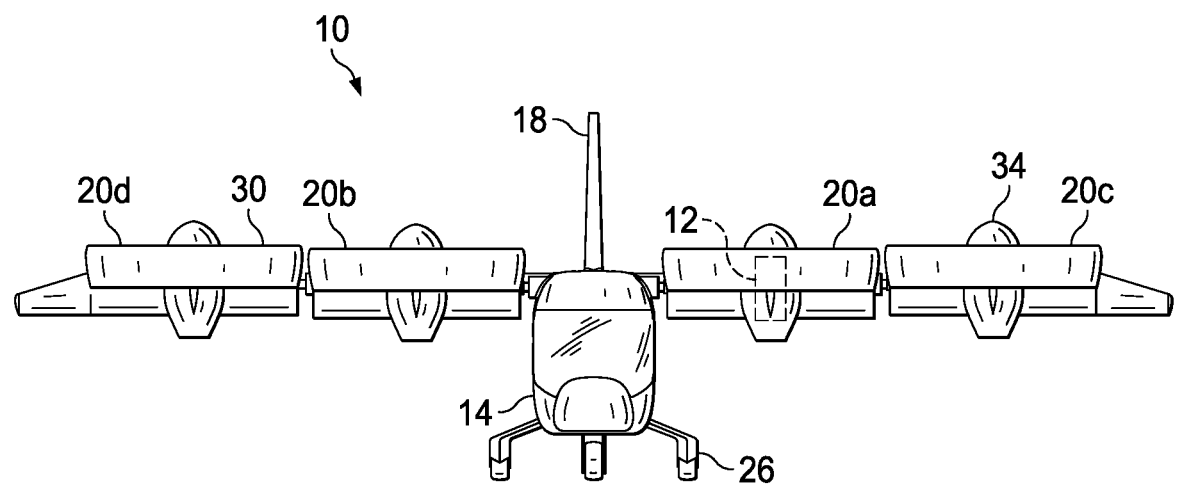
Figure 1E:
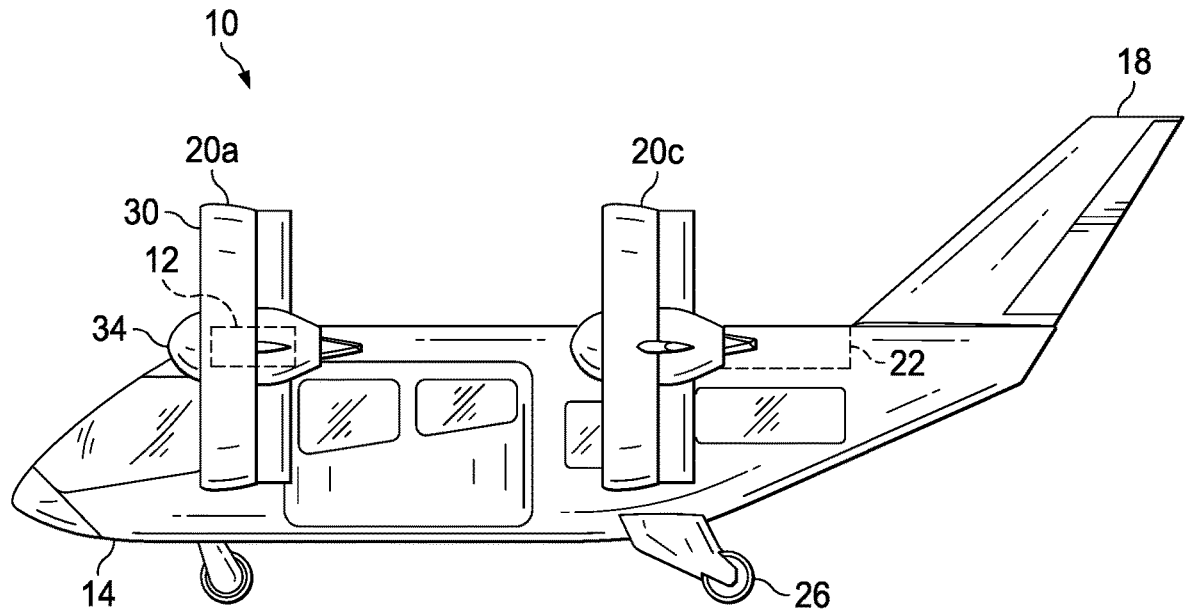
Figure 1F:
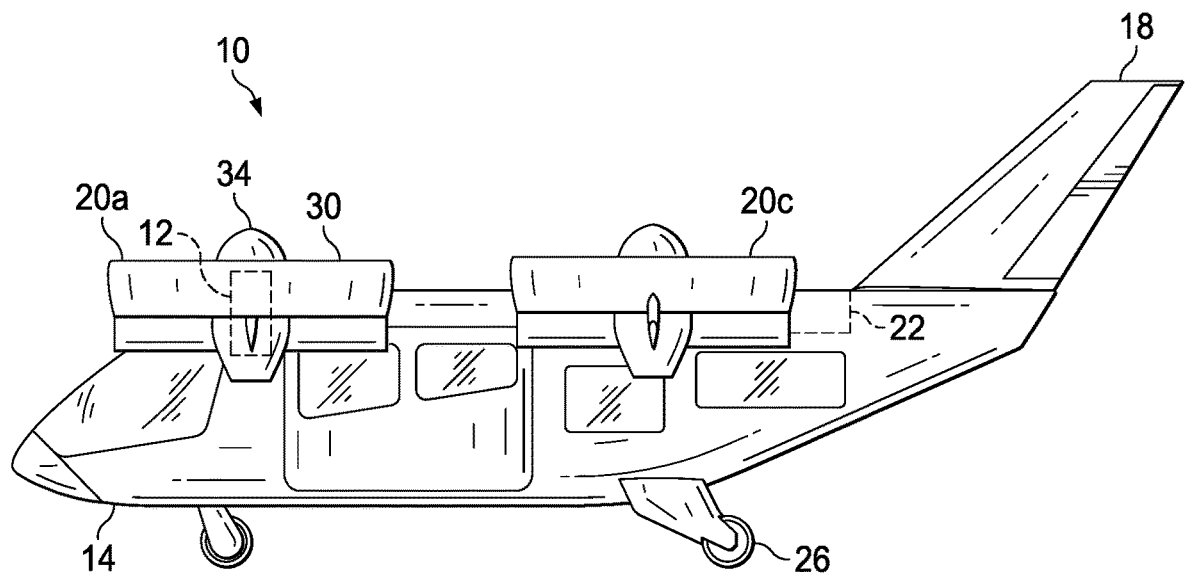

Referring to FIGS. 1A-1F in the drawings, various views of an aircraft 10 implementing line replaceable centerbody assemblies 12 are depicted. FIGS. 1B, 1D and 1F depict aircraft 10 in a vertical takeoff and landing (VTOL) flight mode wherein the ducted propulsion assemblies provide thrust-borne lift. FIGS. 1A, 1C and 1E depict aircraft 10 in a forward flight mode wherein the ducted propulsion assemblies provide forward thrust with the forward airspeed of aircraft 10 providing wing-borne lift, thereby enabling aircraft 10 to have a high speed and/or high endurance forward flight mode. Aircraft 10 has a longitudinal axis 10a that may also be referred to as the roll axis, a lateral axis 10b that may also be referred to as the pitch axis and a vertical axis 10c that may also be referred to as the yaw axis, as best seen in FIGS. 1A-1B. As illustrated, when longitudinal axis 10a and lateral axis 10b are both in a horizontal plane that is normal to the local vertical in the earth's reference frame, aircraft 10 has a level flight attitude.

In the illustrated embodiment, aircraft 10 has an airframe including a fuselage 14, wings 16a, 16b and a tail assembly 18. Wings 16a, 16b have an airfoil cross-section that generates lift responsive to the forward airspeed of aircraft 10. In the illustrated embodiment, wings 16a, 16b are straight wings with a tapered leading edge. It will be appreciated, however, that wings 16a, 16b may be of a wide variety of shapes, sizes and configurations, depending upon the performance characteristics desired. In the illustrated embodiment, wings 16a, 16b include ailerons to aid in roll and/or pitch control of aircraft 10 during forward flight. Tail assembly 18 is depicted as a vertical fin, or stabilizer, that may include one or more rudders to control the yaw of aircraft 10 during forward flight. In other embodiments, tail assembly 18 may have two or more vertical fins and/or a horizontal stabilizer that may include one or more elevators to control the pitch of aircraft 10 during forward flight. It will be appreciated, however, that tail assembly 18 may be of a wide variety of shapes, sizes and configurations, depending upon the performance characteristics desired.

In the illustrated embodiment, aircraft 10 includes four ducted propulsion assemblies, each having a proprotor assembly, forming a distributed thrust array that is coupled to the airframe of aircraft 10. As used herein, the term "distributed thrust array" refers to the use of multiple thrust generating elements, each producing a portion of the total thrust output. The thrust array of aircraft 10 includes a forward-port ducted propulsion assembly 20a, a forward-starboard ducted propulsion assembly 20b, an aft-port ducted propulsion assembly 20c and an aft-starboard ducted propulsion assembly 20d, which may be referred to collectively as ducted propulsion assemblies 20. Forward-port ducted propulsion assembly 20a and forward-starboard ducted propulsion assembly 20b are each rotatably mounted via a spindle to a shoulder portion of fuselage 14 at a forward station thereof. Aft-port ducted propulsion assembly 20c is rotatably mounted via a spindle on the outboard end of wing 16a. Aft-starboard ducted propulsion assembly 20d is rotatably mounted via a spindle on the outboard end of wing 16b. Ducted propulsion assemblies 20 may each include at least one variable speed electric motor and a speed controller configured to provide variable speed control to the proprotor assembly over a wide range of rotor speeds, and such variable speed electric motors and speed controllers may, in some embodiments, be housed in line replaceable centerbody assemblies 12 as discussed herein.

When aircraft 10 is operating in the VTOL flight mode and supported by thrust-borne lift, ducted propulsion assemblies 20 each have a generally horizontal position such that the proprotor assemblies are rotating in generally the same horizontal plane, as best seen in FIGS. 1D and 1F. When aircraft 10 is operating in the forward flight mode and supported by wing-borne lift, ducted propulsion assemblies 20 each have a generally vertical position with the forward proprotor assemblies rotating generally in a forward vertical plane and the aft proprotor assemblies rotating generally in an aft vertical plane, as best seen in FIG. 1E. Transitions between the VTOL flight mode and the forward flight mode of aircraft 10 are achieved by changing the angular positions of ducted propulsion assemblies 20 between their generally horizontal positions and their generally vertical positions as discussed herein.

Aircraft 10 may include a liquid fuel powered turbo-generator that includes a gas turbine engine and an electric generator. Preferably, the electric generator charges an array of batteries 22 that provides power to the electric motors of ducted propulsion assemblies 20 via a power management system. Batteries 22, while illustrated as being in an aft portion of fuselage 14, may be located anywhere and distributed in any manner on aircraft 10. In other embodiments, the turbo-generator may provide power directly to the power management system and/or the electric motors of ducted propulsion assemblies 20. In yet other embodiments, ducted propulsion assemblies 20 may be mechanically driven by the power plant of aircraft 10 via suitable gearing, shafting and clutching systems.

Aircraft 10 has a fly-by-wire control system that includes a flight control computer 24 that is preferably a redundant digital flight control system including multiple independent flight control computers. Flight control computer 24 preferably includes non-transitory computer readable storage media including a set of computer instructions executable by one or more processors for controlling the operation of aircraft 10. Flight control computer 24 may be implemented on one or more general-purpose computers, special purpose computers or other machines with memory and processing capability. Flight control computer 24 may include one or more memory storage modules including random access memory, non-volatile memory, removable memory or other suitable memory. Flight control computer 24 may be a microprocessor-based system operable to execute program code in the form of machine-executable instructions. Flight control computer 24 may be connected to other computer systems via a suitable communications network that may include both wired and wireless connections.

Flight control computer 24 communicates via a wired communications network within the airframe of aircraft 10 with the electronics nodes of each ducted propulsion assembly 20. The electronics nodes may, in some embodiments, be part of line replaceable centerbody assemblies 12 as discussed herein. Flight control computer 24 receives sensor data from and sends flight command information to ducted propulsion assemblies 20 such that each ducted propulsion assembly 20 may be individually and independently controlled and operated. For example, flight control computer 24 is operable to individually and independently control the proprotor speed and collective blade pitch of each ducted propulsion assembly 20 as well as the angular position of each ducted propulsion assembly 20. Flight control computer 24 may autonomously control some or all aspects of flight operation for aircraft 10. Flight control computer 24 is also operable to communicate with remote systems, such as a ground station via a wireless communications protocol. The remote system may be operable to receive flight data from and provide commands to flight control computer 24 to enable remote flight control over some or all aspects of flight operation for aircraft 10. In addition, aircraft 10 may be pilot operated such that a pilot interacts with a pilot interface that receives flight data from and provides commands to flight control computer 24 to enable onboard pilot control over some or all aspects of flight operation for aircraft 10.

Aircraft 10 includes landing gear 26 for ground operations. Landing gear 26 may include passively operated pneumatic landing struts or actively operated landing struts. In the illustrated embodiment, landing gear 26 includes a plurality of wheels that enable aircraft 10 to taxi and perform other ground maneuvers. Landing gear 26 may include a passive brake system, an active brake system such as an electromechanical braking system and/or a manual brake system to facilitate parking as required during ground operations and/or passenger ingress and egress.

In the illustrated embodiment, ducted propulsion assemblies 20 each have a five bladed proprotor assembly with variable pitch proprotor blades 28 operable for collective pitch control. In other embodiments, the number of proprotor blades could be either greater than or less than five and/or the proprotor blades could have a fixed pitch. Proprotor blades 28 of each ducted propulsion assembly 20 are surrounded by a duct 30, which is supported by stators 32. Duct 30 and stators 32 may be formed from metallic, composite, carbon-based or other sufficiently rigid materials. The inclusion of duct 30 on each ducted propulsion assembly 20 offers several benefits over open proprotor systems having exposed proprotor blades. For example, ducted propulsion assemblies 20 emit less noise and are therefore preferred when a reduced noise environment is desired, such as during air reconnaissance, clandestine operations or flight in urban airspace. Ducts 30 increase safety for ground personnel and crew by preventing inadvertent collisions with a spinning proprotor. Openly exposed proprotors can lead to blade tip thrust losses during flight. By reducing proprotor blade tip losses, ducted propulsion assemblies 20 are more efficient in producing thrust than open proprotor systems of similar diameter, especially at low speed and high static thrust levels. Also, the thrust vectoring capabilities of open rotor systems are limited as is the use of pressure differentials to augment thrust.

At the center of each ducted propulsion assembly 20 is a respective centerbody assembly 12 that includes systems and components to facilitate the operation of ducted propulsion assemblies 20. Over time, the systems and components included with each centerbody assembly 12 may deteriorate or fail. In previously implemented aircraft, the maintenance of systems and components housed by centerbody assemblies is both expensive and labor-intensive because the centerbody assemblies must be repaired while they are installed in the ducted propulsion system. Maintenance of previously implemented centerbody assemblies must also be performed at facilities capable of housing entire aircraft since the centerbody assemblies are permanently affixed to the aircraft. The systems and components in previously implemented centerbody assemblies may also be difficult to access by technicians while the centerbody assembly is attached to the ducted propulsion assembly.

To address these and other issues present in currently implemented centerbody assemblies, each ducted propulsion assembly 20 includes a respective line replaceable centerbody assembly 12. Line replaceable centerbody assemblies 12 are interchangeably coupled and isostatically mounted to the proximal ends 32a of stators 32. Each line replaceable centerbody assembly 12 includes one or more electric motors that drive an output driveshaft. Proprotor assemblies 34 are interchangeably coupled to and rotatable with the output driveshafts of line replaceable centerbody assemblies 12. Line replaceable centerbody assemblies 12 include rapid mechanical and electrical connection interfaces that allow for rapid in-situ removal and installation of line replaceable centerbody assemblies 12. The rapid mechanical connection interfaces of line replaceable centerbody assemblies 12 may be configured to isostatically mount line replaceable centerbody assemblies 12 to stators 32. The rapid electrical connection interfaces of line replaceable centerbody assemblies 12 allow for each line replaceable centerbody assembly 12 to receive power from batteries 22 or another power source of aircraft 10. The rapid mechanical and electrical connection interfaces of line replaceable centerbody assemblies 12 also allow line replaceable centerbody assemblies 12 to be easily removed for repairs or maintenance as well as easily installed back onto aircraft 10. Line replaceable centerbody assemblies 12 may be built, repaired and/or maintained after being removed from aircraft 10 to allow for assembly, repair or maintenance to occur at an off-site assembly plant or maintenance facility without requiring the presence of aircraft 10 itself. Line replaceable centerbody assemblies 12 may also be swapped out of aircraft 10 between missions or after a predetermined number of flight hours. The interchangeability of line replaceable centerbody assemblies 12 greatly reduces the cost and time associated with the repair, maintenance and upgrading of line replaceable centerbody assemblies 12.

It should be appreciated that aircraft 10 is merely illustrative of a variety of aircraft that can implement the embodiments disclosed herein. Indeed, line replaceable centerbody assemblies 12 may be implemented on any aircraft that utilizes one or more ducts. Other aircraft implementations can include hybrid aircraft, tiltwing aircraft, unmanned aircraft, gyrocopters, propeller-driven airplanes, quadcopters, compound helicopters, jets, drones and the like. While many of the illustrative embodiments are described herein as being implemented on ducted proprotors, the illustrative embodiments may also be implemented on ducted rotors such as those present on helicopters or quadcopters. Line replaceable centerbody assemblies 12 may also be implemented on ducted tail rotors or anti-torque systems. As such, those skilled in the art will recognize that line replaceable centerbody assemblies 12 can be integrated into a variety of aircraft configurations. It should be appreciated that even though aircraft are particularly well-suited to implement the embodiments of the present disclosure, non-aircraft vehicles and devices can also implement the embodiments.

Figure 2:
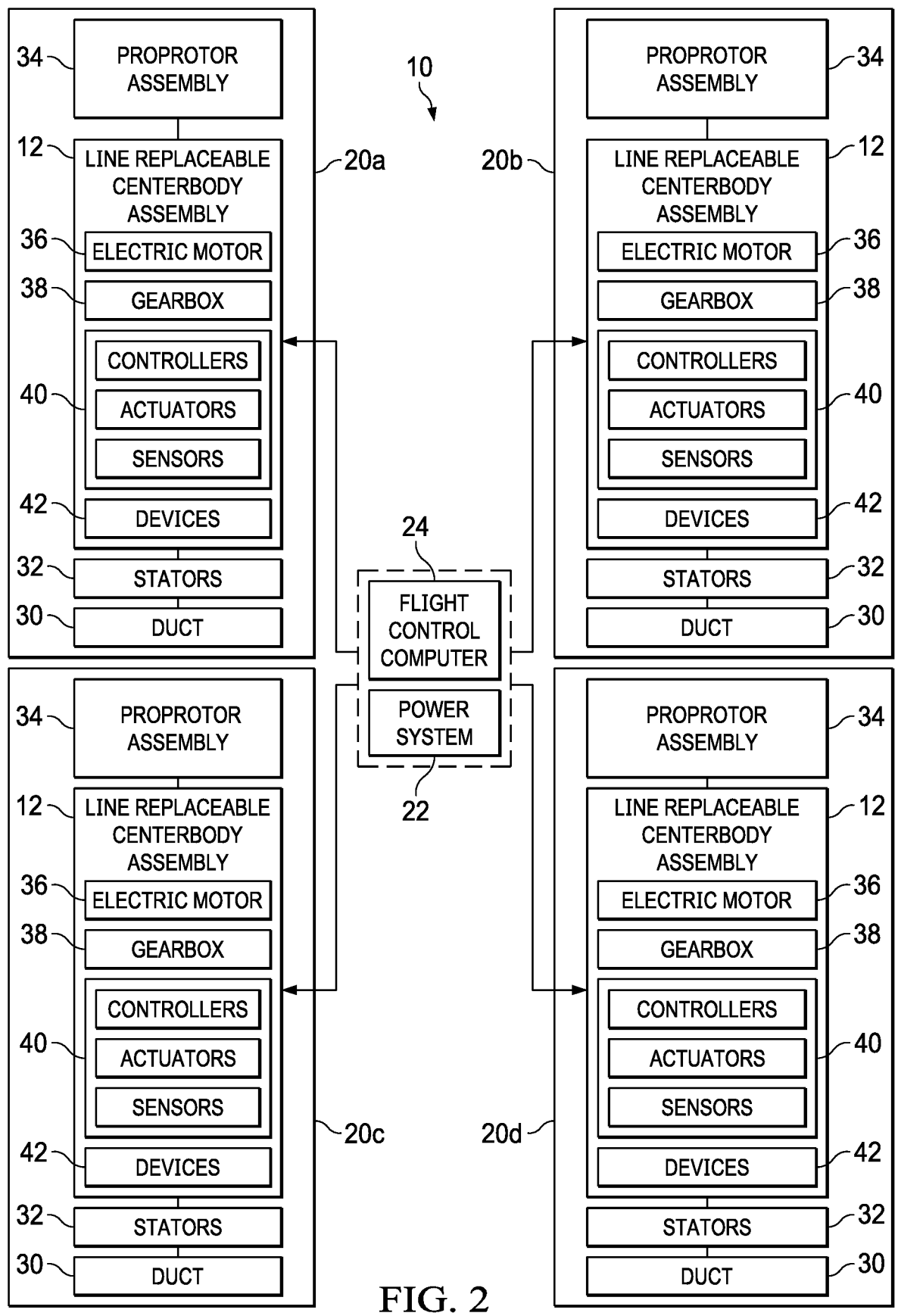
FIG. 2 is a block diagram of a propulsion and control system for an aircraft having ducted propulsion assemblies configured for use with line replaceable centerbody assemblies in accordance with embodiments of the present disclosure.

Referring additionally to FIG. 2 in the drawings, various systems of aircraft 10, which includes line replaceable centerbody assemblies 12, are depicted. As discussed herein, aircraft 10 includes flight control computer 24, a power system such as batteries 22 and a distributed thrust array depicted as forward-port ducted propulsion assembly 20a, forward-starboard ducted propulsion assembly 20b, aft-port ducted propulsion assembly 20c and aft-starboard ducted propulsion assembly 20d. Each ducted propulsion assembly 20 includes a respective duct 30 supported by respective stators 32. Interchangeably coupled to stators 32 of each ducted propulsion assembly 20 are respective line replaceable centerbody assemblies 12 to which proprotor assemblies 34 including proprotor blades are coupled. Each line replaceable centerbody assembly 12 includes one or more electric motors 36 that produce rotational energy transmitted to a respective one of proprotor assemblies 34 via a gearbox 38. Each line replaceable centerbody assembly 12 includes an electronics node 40 depicted as having one or more controllers such as an electronic speed controller, one or more sensors and one or more actuators such as a gimbal, pitch or control surface actuator. Line replaceable centerbody assemblies 12 may also include additional devices 42 such as motor cooling systems, oil management systems, control surfaces and the like, as discussed herein.

Figure 3:
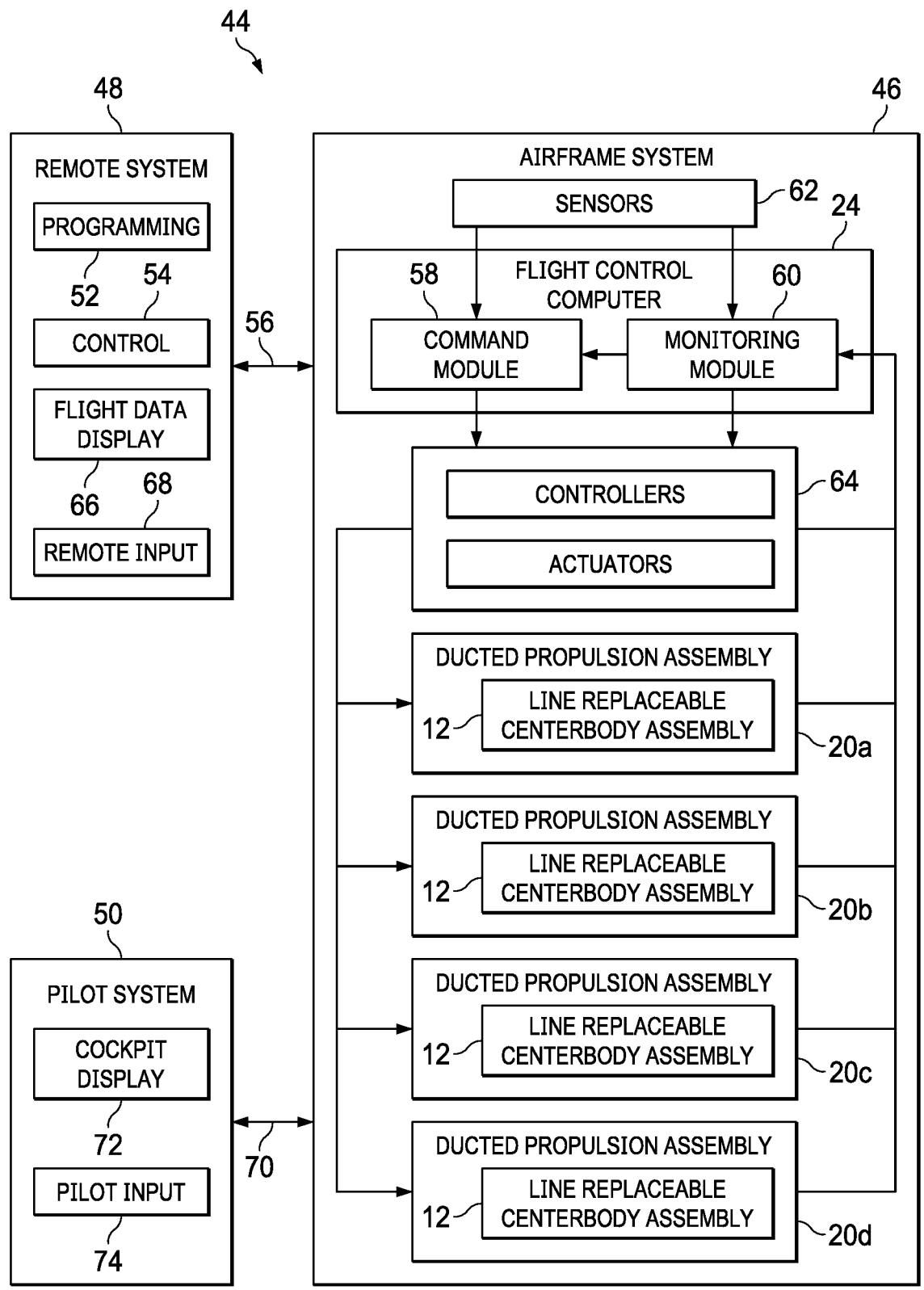
FIG. 3 is a block diagram of a control system for an aircraft having ducted propulsion assemblies configured for use with line replaceable centerbody assemblies in accordance with embodiments of the present disclosure.

Referring additionally to FIG. 3 in the drawings, a block diagram depicts a control system 44 operable for use with aircraft 10 of the present disclosure. In the illustrated embodiment, control system 44 includes three primary computer based subsystems; namely, an airframe system 46, a remote system 48 and a pilot system 50. In some implementations, remote system 48 includes a programming application 52 and a remote control application 54. Programming application 52 enables a user to provide a flight plan and mission information to aircraft 10 such that flight control computer 24 may engage in autonomous control over aircraft 10. For example, programming application 52 may communicate with flight control computer 24 over a wired and/or wireless communication channel 56 to provide a flight plan including, for example, a starting point, a trail of waypoints and an ending point such that flight control computer 24 may use waypoint navigation during the mission.

In the illustrated embodiment, flight control computer 24 is a computer based system that includes a command module 58 and a monitoring module 60. It is to be understood by those skilled in the art that these and other modules executed by flight control computer 24 may be implemented in a variety of forms including hardware, software, firmware, special purpose processors and combinations thereof. Flight control computer 24 receives input from a variety of sources including internal sources such as sensors 62, controllers and actuators 64 and ducted propulsion assemblies 20 including line replaceable centerbody assemblies 12 and external sources such as remote system 48 as well as global positioning system satellites or other location positioning systems and the like. During the various operating modes of aircraft 10 including the VTOL flight mode, the forward flight mode and transitions therebetween, command module 58 provides commands to controllers and actuators 64. These commands enable independent operation of each ducted propulsion assembly 20 such as rotor speed and angular position. Flight control computer 24 receives feedback and sensor measurements from sensors 62, controllers and actuators 64 and ducted propulsion assemblies 20. This feedback is processed by monitoring module 60, which can supply correction data and other information to command module 58 and/or controllers and actuators 64. Sensors 62, such as strain sensors, distance sensors, accelerometers, vibration sensors, location sensors, attitude sensors, speed sensors, environmental sensors, fuel sensors, temperature sensors and the like also provide information to flight control computer 24 to further enhance autonomous control capabilities.

Some or all of the autonomous control capability of flight control computer 24 can be augmented or supplanted by remote flight control from, for example, remote system 48. Remote system 48 may include one or more computing systems that may be implemented on general-purpose computers, special purpose computers or other machines with memory and processing capability. Remote system 48 may be a microprocessor-based system operable to execute program code in the form of machine-executable instructions. In addition, remote system 48 may be connected to other computer systems via a proprietary encrypted network, a public encrypted network, the Internet or other suitable communication network that may include both wired and wireless connections. Remote system 48 communicates with flight control computer 24 via communication channel 56 that may include wired and/or wireless connections.

While operating remote control application 54, remote system 48 is configured to display information relating to one or more aircraft of the present disclosure on one or more flight data display devices 66. Remote system 48 may also include audio output and input devices such as a microphone, speakers and/or an audio port allowing an operator to communicate with other operators, a base station and/or a pilot on aircraft 10. Display device 66 may also serve as a remote input device 68 if a touch screen display implementation is used, although other remote input devices such as a keyboard or joystick may alternatively be used to allow an operator to provide control commands to an aircraft being operated responsive to remote control.

Some or all of the autonomous and/or remote flight control of aircraft 10 can be augmented or supplanted by onboard pilot flight control from a pilot interface system 50 that includes one or more computing systems that communicate with flight control computer 24 via one or more wired communication channels 70. Pilot system 50 preferably includes one or more cockpit display devices 72 configured to display information to the pilot. Cockpit display device 72 may be configured in any suitable form including, for example, a display panel, a dashboard display, an augmented reality display or the like. Pilot system 50 may also include audio output and input devices such as a microphone, speakers and/or an audio port allowing an onboard pilot to communicate with, for example, air traffic control. Pilot system 50 also includes a plurality of user interface devices 74 to allow an onboard pilot to provide control commands to aircraft 10 including, for example, a control panel with switches or other inputs, mechanical control devices such as steering devices or sticks, voice control as well as other control devices.

Figure 4D:
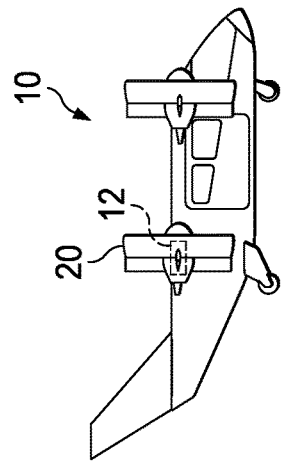
FIGS. 4A-4H are schematic illustrations of an aircraft having ducted propulsion assemblies configured for use with line replaceable centerbody assemblies in a sequential flight operating scenario in accordance with embodiments of the present disclosure.
Figure 4C:
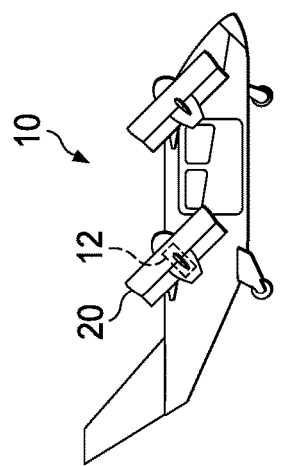
Figure 4B:
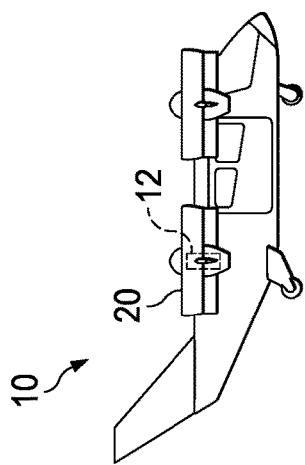
Figure 4A:
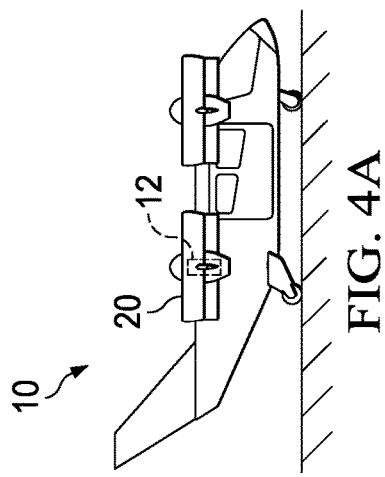

Referring additionally to FIGS. 4A-4H in the drawings, a sequential flight-operating scenario of aircraft 10 including ducted propulsion assemblies 20 is depicted. Ducted propulsion assemblies 20 include forward-port, forward-starboard, aft-port and aft-starboard proprotor systems. As best seen in FIG. 4A, aircraft 10 is positioned on the ground prior to takeoff. When aircraft 10 is ready for a mission, the flight control computer commences operations to provide flight control to aircraft 10 which may be onboard pilot flight control, remote flight control, autonomous flight control or a combination thereof. For example, it may be desirable to utilize onboard pilot flight control during certain maneuvers such as takeoff and landing but rely on autonomous flight control during hover, high speed forward flight and/or transitions between wing-borne flight and thrust-borne flight. Any one or more of line replaceable centerbody assemblies 12 may be swapped or replaced on any of ducted propulsion assemblies 20 before aircraft 10 takes off.

As best seen in FIG. 4B, aircraft 10 has performed a vertical takeoff and is engaged in thrust-borne lift. As illustrated, the proprotor assemblies of each ducted propulsion assembly 20 are rotating in the same horizontal plane forming a distributed thrust array of four proprotor systems. As the longitudinal axis and the lateral axis of aircraft 10 are both in the horizontal plane, aircraft 10 has a level flight attitude. During hover, the flight control computer utilizes individual variable speed and blade pitch control capabilities of line replaceable centerbody assemblies 12 to control flight dynamics to maintain hover stability and to provide pitch, roll and yaw authority for aircraft 10. More specifically, as each line replaceable centerbody assembly 12 is independently controllable, operational changes to certain line replaceable centerbody assemblies 12 enable pitch, roll and yaw control of aircraft 10 during VTOL operations.

For example, by changing the thrust output or collective pitch of the forward proprotor systems relative to the aft proprotor systems, pitch control is achieved. As another example, by changing the thrust output or collective pitch of the port proprotor systems relative to the starboard proprotor systems, roll control is achieved. Changing the relative thrust outputs of the various ducted propulsion assemblies 20 may be accomplished using differential rotor speed control, that is, increasing the rotor speed of some proprotor assemblies relative to the rotor speed of other proprotor assemblies and/or decreasing the rotor speed of some proprotor assemblies relative to the rotor speed of other proprotor assemblies. Changing the relative thrust outputs of the various ducted propulsion assemblies 20 may also be accomplished using collective blade pitch. Yaw control or torque balancing of aircraft 10 during VTOL operations may be accomplished by changing the torque output of certain ducted propulsion assemblies 20. For example, the forward-port and aft-starboard ducted propulsion assemblies may have clockwise rotating proprotor assemblies while the forward-starboard and aft-port ducted propulsion assemblies may have counterclockwise rotating proprotor assemblies. In this example, by changing the torque output of the forward-port and aft-starboard ducted propulsion assemblies relative to the forward-starboard and aft-port ducted propulsion assemblies, yaw control is achieved. Changing the relative torque outputs of the various ducted propulsion assemblies 20 is preferably accomplished using differential rotor speed control.

Returning to the sequential flight-operating scenario of aircraft 10, after vertical ascent to the desired elevation, aircraft 10 may begin the transition from thrust-borne lift to wing-borne lift. As best seen from the progression of FIGS. 4B-4D, the angular positions of ducted propulsion assemblies 20 are changed by a pitch down rotation to transition aircraft 10 from the VTOL flight mode toward the forward flight mode. As seen in FIG. 4C, ducted propulsion assemblies 20 have been collectively inclined about 45 degrees pitch down. In the conversion orientations of aircraft 10, a portion of the thrust generated by ducted propulsion assemblies 20 provides lift while a portion of the thrust generated by ducted propulsion assemblies 20 urges aircraft 10 to accelerate in the forward direction such that the forward airspeed of aircraft 10 increases allowing the wings of aircraft 10 to offload a portion and eventually all of the lift requirement from ducted propulsion assemblies 20.

Figure 4H:
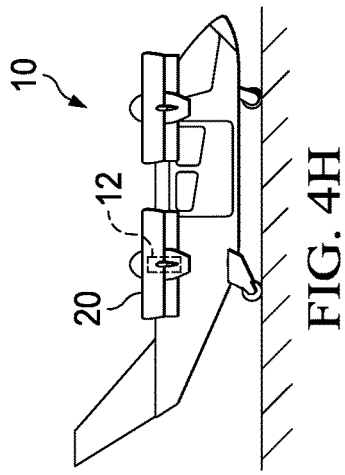
Figure 4G:
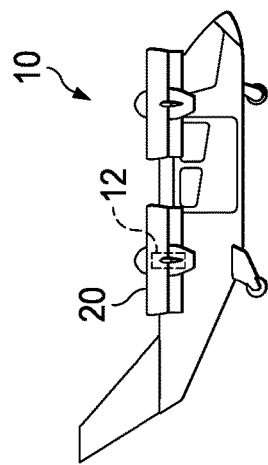
Figure 4F:
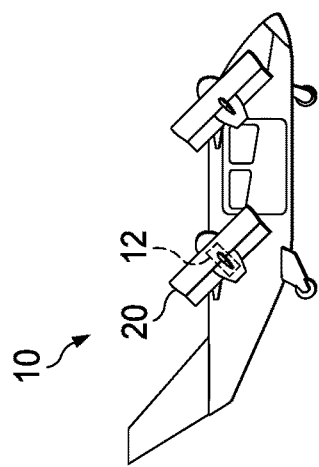
Figure 4E:
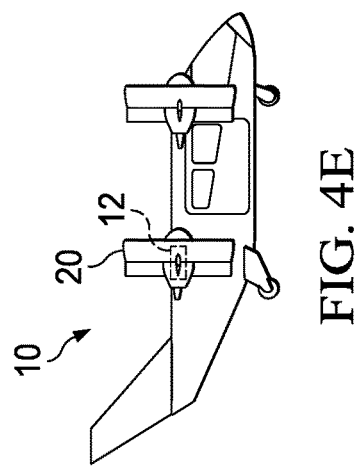
Figure 5A:
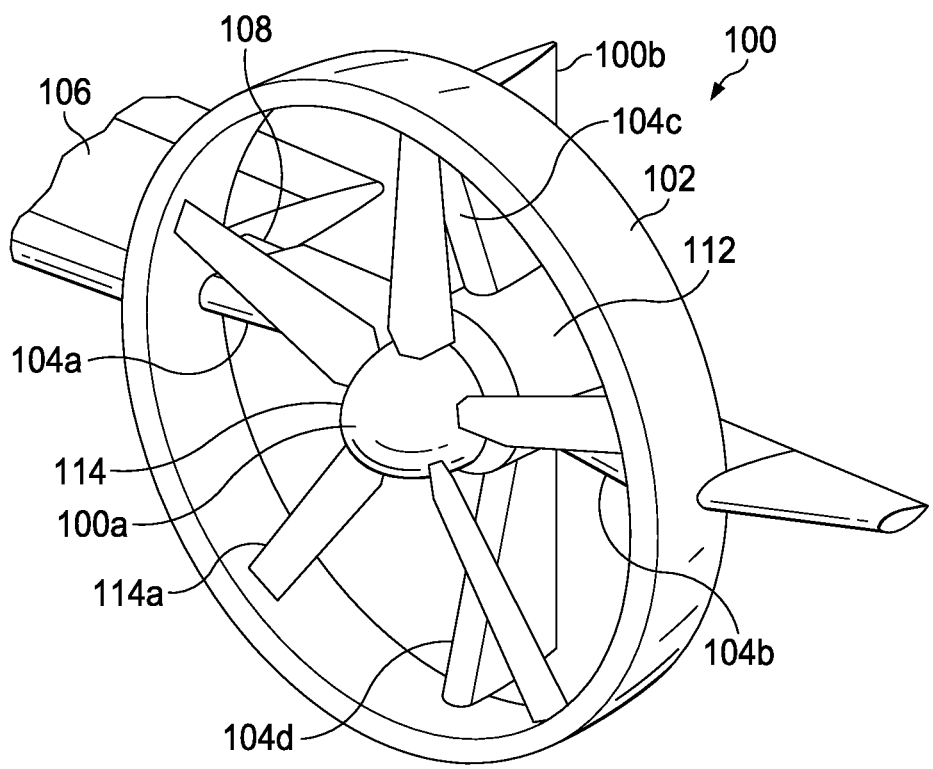
FIGS. 5A-5F are various views of a ducted propulsion assembly including a line replaceable centerbody assembly in accordance with embodiments of the present disclosure.
Figure 5B:
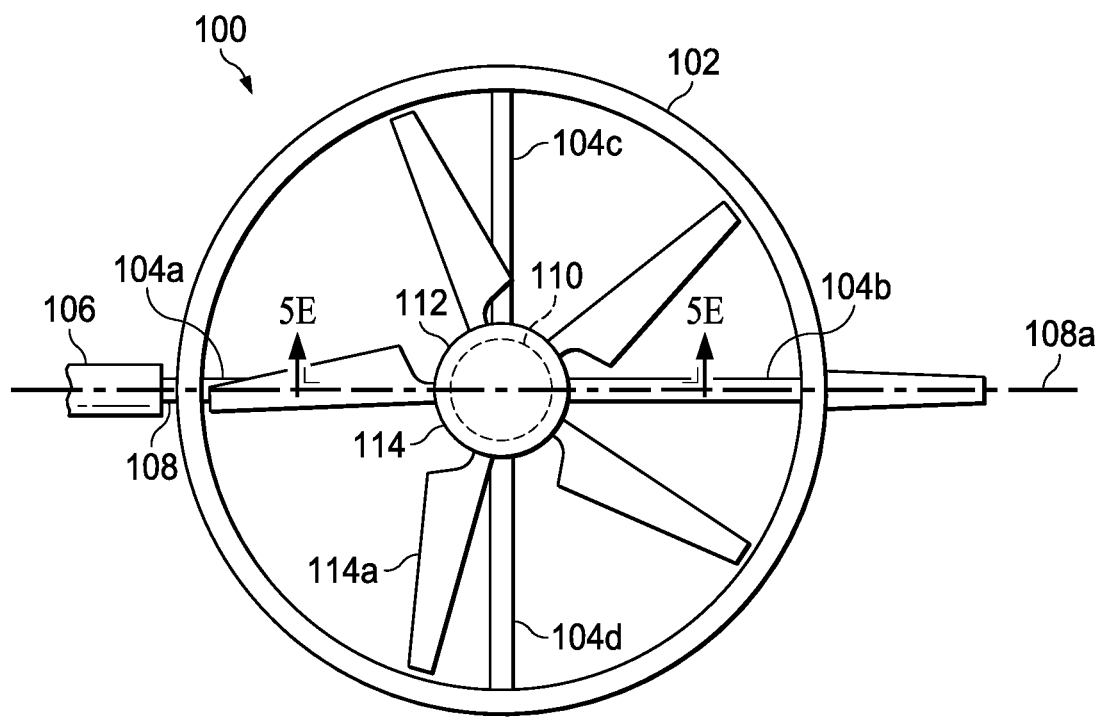
Figure 5C:
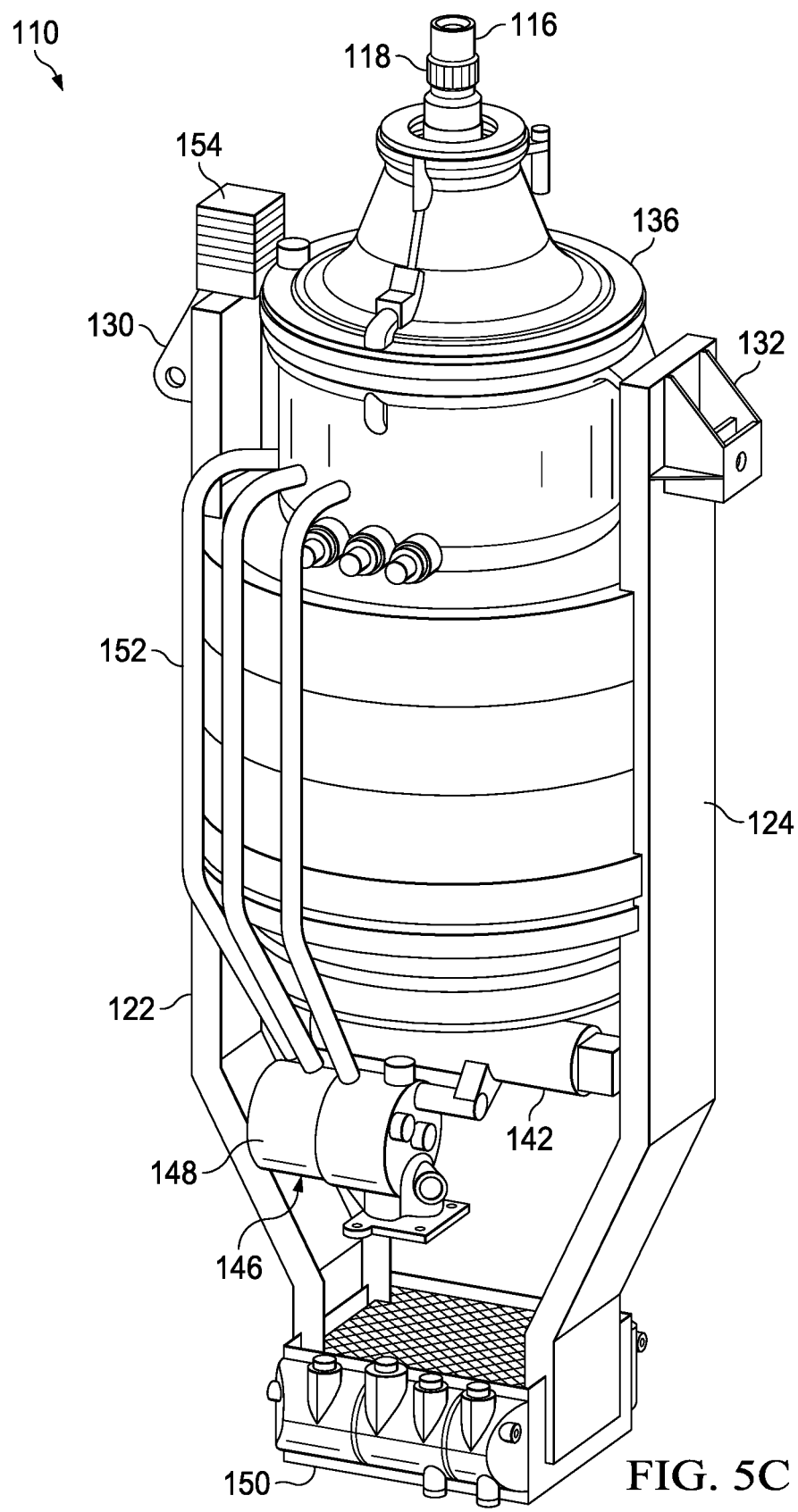
Figure 5D:
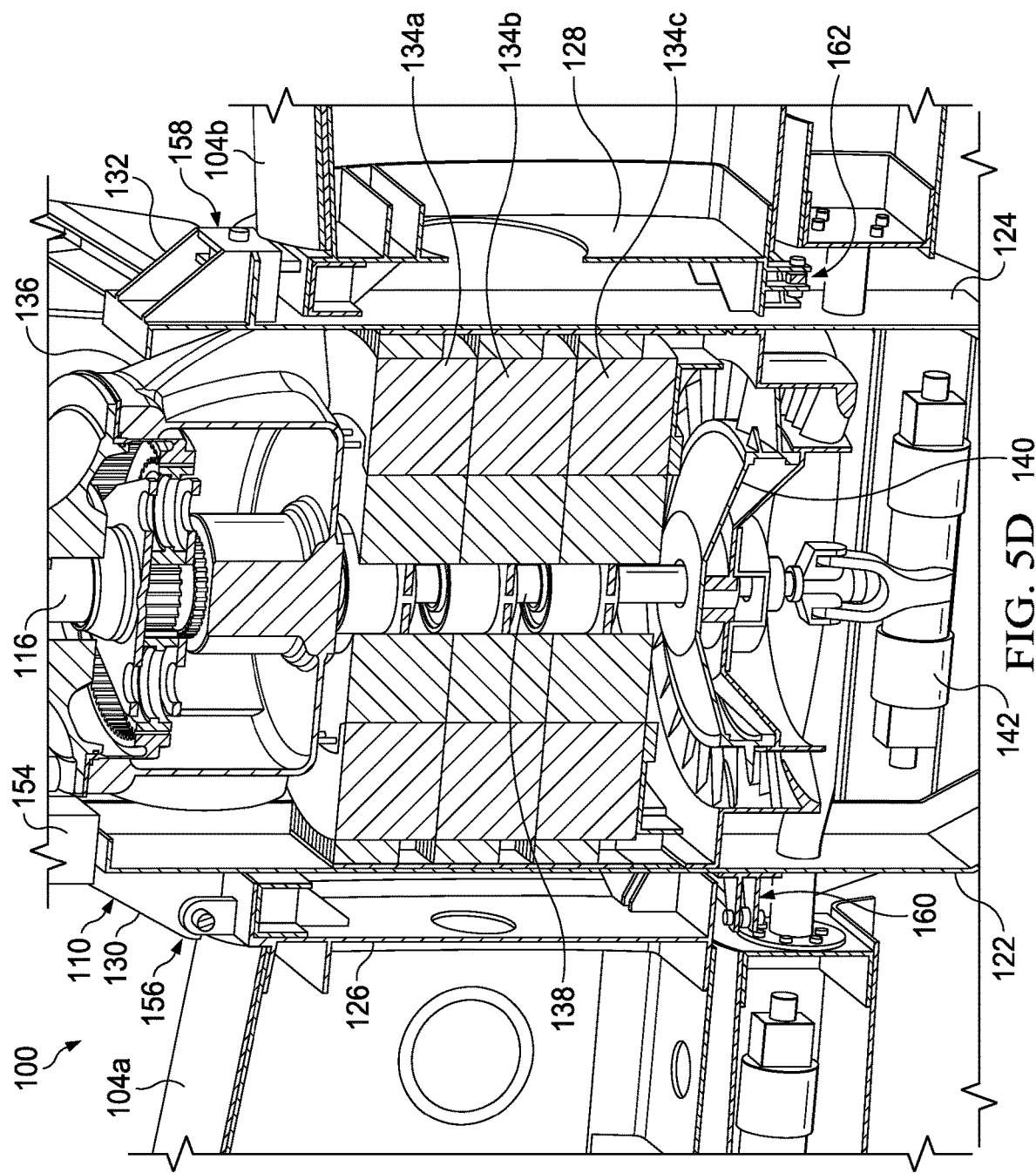
Figure 5E:
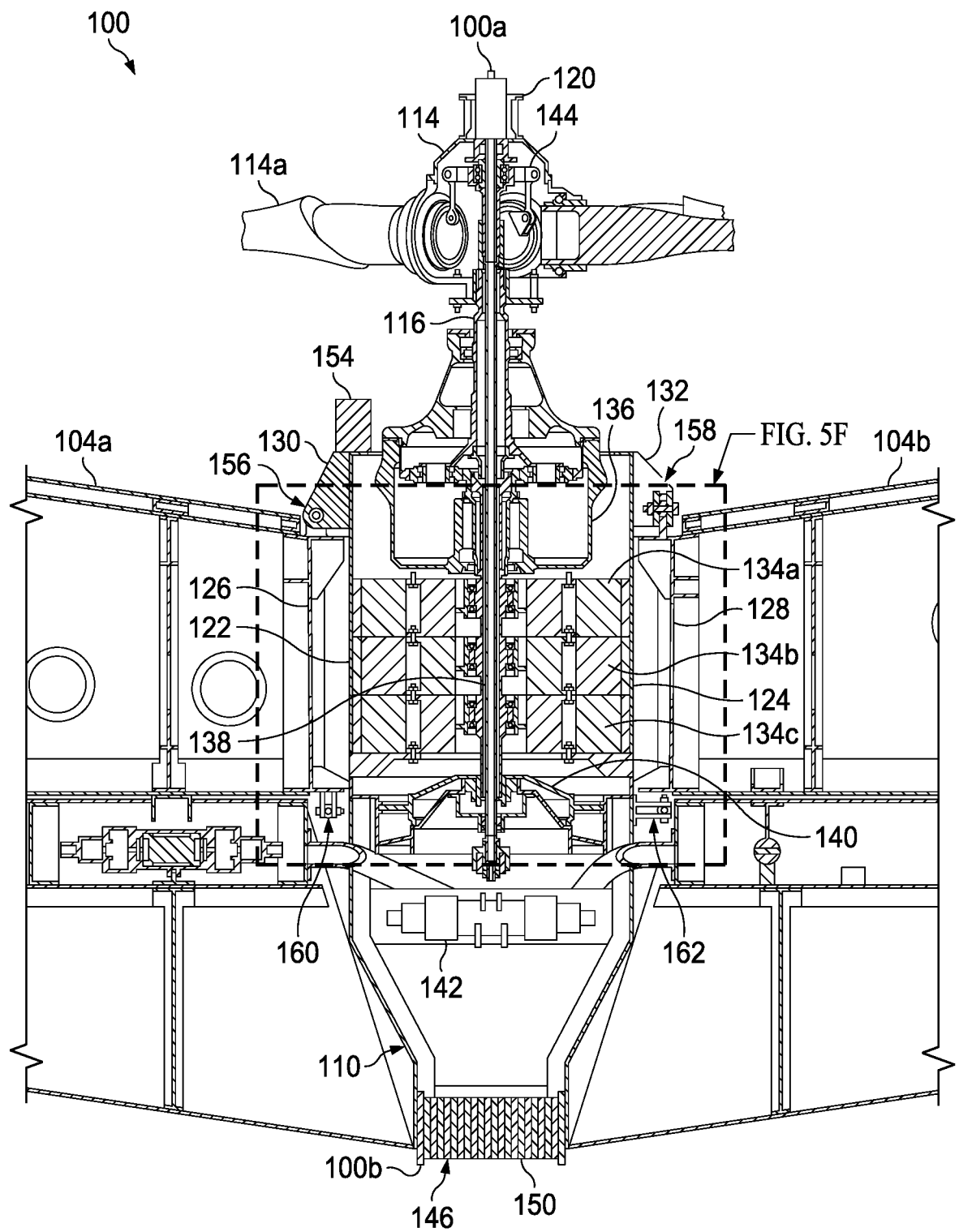
Figure 5F:
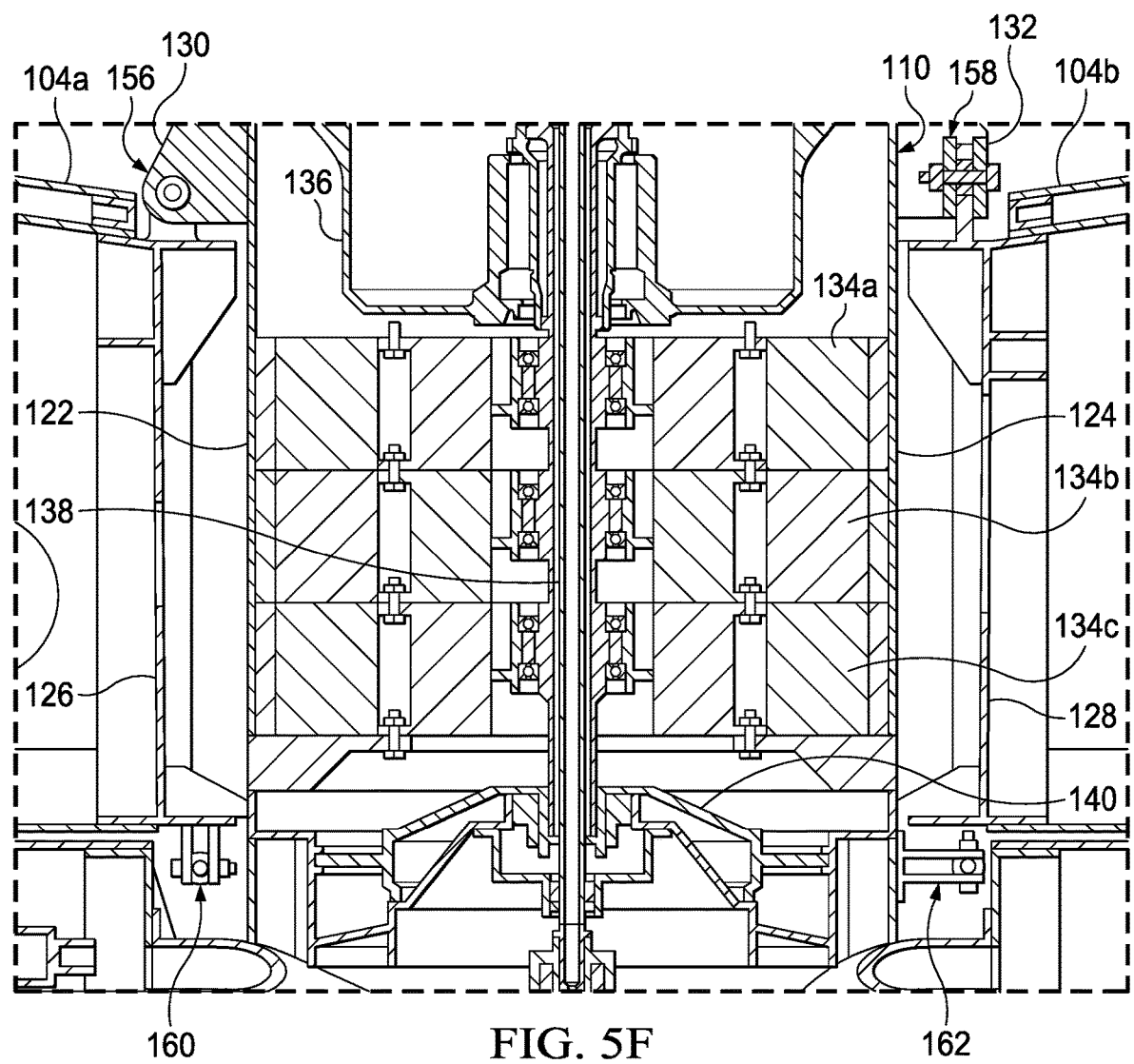

As best seen in FIGS. 4D-4E, ducted propulsion assemblies 20 have been collectively inclined about 90 degrees pitch down such that the proprotor assemblies are rotating in vertical planes providing forward thrust for aircraft 10 while the wings provide lift. Even though the conversion from the VTOL flight mode to the forward flight mode of aircraft 10 has been described as progressing with collective pitch down rotation of ducted propulsion assemblies 20, in other implementations, all ducted propulsion assemblies 20 need not be operated at the same time or at the same rate. As forward flight with wing-borne lift requires significantly less thrust than VTOL flight with thrust-borne lift, the operating speed of some or all of ducted propulsion assemblies 20 may be reduced particularly in embodiments having collective pitch control.

In certain embodiments, some of ducted propulsion assemblies 20 of aircraft 10 could be shut down during forward flight. In the forward flight mode, the independent rotor speed control provided by the flight control computer over each ducted propulsion assembly 20 may provide yaw authority for aircraft 10. For example, by changing the thrust output of either or both port ducted propulsion assemblies relative to the starboard ducted propulsion assemblies, yaw control is achieved. Changing the relative thrust outputs of the various ducted propulsion assemblies 20 may be accomplished using differential rotor speed control. Changing the relative thrust outputs of the various ducted propulsion assemblies 20 may also be accomplished using collective pitch control. In the forward flight mode, pitch and roll authority is preferably provided by the ailerons and/or elevators on the wings and/or tail assembly of aircraft 10.

As aircraft 10 approaches its destination, aircraft 10 may begin its transition from wing-borne lift to thrust-borne lift. As best seen from the progression of FIGS. 4E-4G, the angular positions of ducted propulsion assemblies 20 are changed by a pitch up rotation to transition aircraft 10 from the forward flight mode toward the VTOL flight mode. As seen in FIG. 4F, ducted propulsion assemblies 20 have been collectively inclined about 45 degrees pitch up. In the conversion orientations of aircraft 10, a portion of the thrust generated by ducted propulsion assemblies 20 begins to provide lift for aircraft 10 as the forward airspeed decreases and the lift producing capability of the wings of aircraft 10 decreases. As best seen in FIG. 4G, ducted propulsion assemblies 20 have been collectively inclined about 90 degrees pitch up such that the proprotor assemblies are rotating in the horizontal plane providing thrust-borne lift for aircraft 10. Even though the conversion from the forward flight mode to the VTOL flight mode of aircraft 10 has been described as progressing with collective pitch up rotation of ducted propulsion assemblies 20, in other implementations, all ducted propulsion assemblies 20 need not be operated at the same time or at the same rate. Once aircraft 10 has completed the transition to the VTOL flight mode, aircraft 10 may commence its vertical descent to a surface. As best seen in FIG. 4H, aircraft 10 has landed at the destination location. Once aircraft 10 has landed, line replaceable centerbody assemblies 12 may be rapidly removed from any of ducted propulsion assemblies 20 for repair or maintenance and may be swapped with another line replaceable centerbody assembly.

Referring to FIGS. 5A-5F in the drawings, a ducted propulsion assembly for an aircraft is schematically illustrated and generally designated 100. Ducted propulsion assembly 100 has a leading end 100a and a trailing end 100b, with reference to which the various systems, assemblies and components of ducted propulsion assembly 100 are described herein. Ducted propulsion assembly 100 includes duct 102 supported by stators 104a, 104b, 104c, 104d. Ducted propulsion assembly 100 is rotatably coupled to wing 106 via spindle 108 such that ducted propulsion assembly 100 rotates about axis 108a. Stators 104a, 104b are substantially parallel or collinear with rotation axis 108a while stators 104c, 104d are substantially perpendicular to rotation axis 108a. The distal ends of stators 104a, 104b, 104c, 104d are coupled to duct 102. At the center of ducted propulsion assembly 100 is line replaceable centerbody assembly 110 coupled to the proximal ends of stators 104a, 104b. Line replaceable centerbody assembly 110 is covered by a fairing 112. Stators 104a, 104b, 104c, 104d are slanted stators that taper from increasing to decreasing chord length from the distal ends of stators 104a, 104b, 104c, 104d to the proximal ends of stators 104a, 104b, 104c, 104d. In the illustrated embodiment, the leading edges of stators 104a, 104b, 104c, 104d are tapered while the trailing edges of stators 104a, 104b, 104c, 104d are substantially straight, although in other embodiments either or both of the leading or trailing edges of stators 104a, 104b, 104c, 104d may be tapered. In yet other embodiments, stators 104a, 104b, 104c, 104d may be straight stators having straight leading edges. While ducted propulsion assembly 100 is illustrated as having four stators 104a, 104b, 104c, 104d, ducted propulsion assembly 100 may have any number of stators such as two, three, five, ten or more stators.

Proprotor assembly 114 including proprotor blades 114a is interchangeably coupled to output driveshaft 116 of line replaceable centerbody assembly 110. A spline drive connection 118 and a mast nut 120 may be used to secure proprotor assembly 114 to line replaceable centerbody assembly 110. Proprotor assembly 114 is rotatable with output driveshaft 116 of line replaceable centerbody assembly 110 in a rotational plane to generate thrust. In the illustrated embodiment, proprotor blades 114a are variable pitch proprotor blades, although in other embodiments proprotor blades 114a may be fixed pitch proprotor blades.

The various systems and components of line replaceable centerbody assembly 110 are supported and interposed between support rails 122, 124, which act as a structural airframe for line replaceable centerbody assembly 110. Line replaceable centerbody assembly 110 is coupled to the proximal ends of stators 104a, 104b via support rails 122, 124. More particularly, support rails 122, 124 are coupled to end caps 126, 128 at the proximal ends of stators 104a, 104b, respectively. In some embodiments, end caps 126, 128 may be interconnected to form a cylindrical centerbody support frame to which line replaceable centerbody assembly 110 is interchangeably coupled. In other embodiments, end caps 126, 128 may be integral with stators 104a, 104b. Thus, line replaceable centerbody assembly 110 may couple directly to the proximal ends of stators 104a, 104b or to a cylindrical centerbody support frame to which the proximal ends of stators 104a, 104b are attached. In the illustrated embodiment, inboard and outboard support rails 122, 124 are coupled to two stators 104a, 104b to secure line replaceable centerbody assembly 110 within ducted propulsion assembly 100. Inboard and outboard support rails 122, 124 are substantially collinear with spindle 108 and rotation axis 108a. In other embodiments, line replaceable centerbody assembly 110 may have any number of support rails coupled to any number or combination of stators 104a, 104b, 104c, 104d. For example, line replaceable centerbody assembly 110 may be supported by four support rails that couple to all four stators 104a, 104b, 104c, 104d. The leading ends of support rails 122, 124 include end stop fittings 130, 132. In addition to forming part of the rapid mechanical connection interface between line replaceable centerbody assembly 110 and stators 104a, 104b, end stop fittings 130, 132 also act as guides to allow for precise leading-to-trailing positioning of line replaceable centerbody assembly 110 relative to stators 104a, 104b, 104c, 104d. End stop fittings 130, 132 may also abut end caps 126, 128 when line replaceable centerbody assembly 110 is being lowered from a crane or hoist to prevent line replaceable centerbody assembly 110 from falling through duct 102 during installation.

Output driveshaft 116 is driven by one or more electric motors 134a, 134b, 134c housed within line replaceable centerbody assembly 110. In the illustrated embodiment, line replaceable centerbody assembly 110 includes a stacked motor assembly having three coaxial electric motors 134a, 134b, 134c, although in other embodiments the stacked motor assembly may have any number of electric motors. Line replaceable centerbody assembly 110 includes gearbox 136 interposed between electric motors 134a, 134b, 134c and output driveshaft 116. Gearbox 136 receives rotational energy from electric motors 134a, 134b, 134c via a motor driveshaft 138 and outputs rotational energy via output driveshaft 116 at a preferred gear ratio. In the illustrated embodiment, gearbox 136 includes a planetary gear system having an input and an output that are coaxial with electric motors 134a, 134b, 134c. In other embodiments, any number of electric motors 134a, 134b, 134c may have parallel, as opposed to coaxial, axes that are outputted separately into gearbox 136, which sums the outputs of the electric motors to output driveshaft 116.

On the opposite side of electric motors 134a, 134b, 134c as gearbox 136 is a blower fan 140. Blower fan 140 is located on the trailing side of electric motors 134a, 134b, 134c and is rotatable to cool electric motors 134a, 134b, 134c. Blower fan 140 is coaxial with electric motors 134a, 134b, 134c and receives rotational energy from electric motors 134a, 134b, 134c via motor driveshaft 138. Line replaceable centerbody assembly 110 also includes a pitch actuator 142 located on the trailing side of gearbox 136, electric motors 134a, 134b, 134c and blower fan 140. Although in the illustrated embodiment pitch actuator 142 is adjacent to blower fan 140, pitch actuator 142 may be located anywhere on line replaceable centerbody assembly 110. Pitch actuator 142 is configured to couple to proprotor blades 114a to control the pitch thereof based on commands received from, for example, a flight control computer. In some embodiments, one or more rods (not shown) extending longitudinally through line replaceable centerbody assembly 110 connect pitch actuator 142 with a blade pitch assembly 144 at proprotor assembly 114. In such embodiments, pitch actuator 142 moves the one or more rods in the leading and trailing directions to change the pitch of proprotor blades 114a.

Oil or another lubricating substance may be circulated within line replaceable centerbody assembly 110 to lubricate the various components and systems thereof such as electric motors 134a, 134b, 134c and/or the gears in gearbox 136. Line replaceable centerbody assembly 110 includes an oil management system 146 to circulate, clean and/or cool the oil used to lubricate the various systems and components. Oil management system 146 includes an oil filter 148 to filter out undesired debris or contaminants in the oil. In the illustrated embodiment, oil filter 148 is located adjacent to pitch actuator 142, although oil filter 148 may be located anywhere on line replaceable centerbody assembly 110. Oil management system 146 also includes a heat exchanger 150 to cool the oil. Heat exchanger 150 is located at the trailing end of line replaceable centerbody assembly 110, although in other embodiments heat exchanger 150 may be located anywhere on line replaceable centerbody assembly 110. Oil management system 146 may also include a pump (not shown) to circulate the oil throughout line replaceable centerbody assembly 110. Line replaceable centerbody assembly 110 includes one or more conduits such as conduits 152 through which the oil may move between the various systems and components of line replaceable centerbody assembly 110 such as gearbox 136, electric motors 134a, 134b, 134c, oil filter 148, heat exchanger 150 and/or a hydraulic pump. Several components and systems of line replaceable centerbody assembly 110 are interposed between support rails 122, 124. In the illustrated embodiment, gearbox 136, electric motors 134a, 134b, 134c, blower fan 140, pitch actuator 142, oil filter 148 and heat exchanger 150 are interposed between support rails 122, 124, although any combination of these or other elements may be located between support rails 122, 124.

Line replaceable centerbody assembly 110 also includes an instrumentation and controller unit 154. Instrumentation and controller unit 154 may include one or more controllers such as a speed controller. Electric motors 134a, 134b, 134c may rotate at a rotational speed responsive to the speed controller included in instrumentation and controller unit 154. Instrumentation and controller unit 154 may also include one or more power conditioners and/or sensors. In the illustrated embodiment, instrumentation and controller unit 154 is coupled to the leading end of support rail 122, although instrumentation and controller unit 154 may be located anywhere on line replaceable centerbody assembly 110.

Figure 6B:
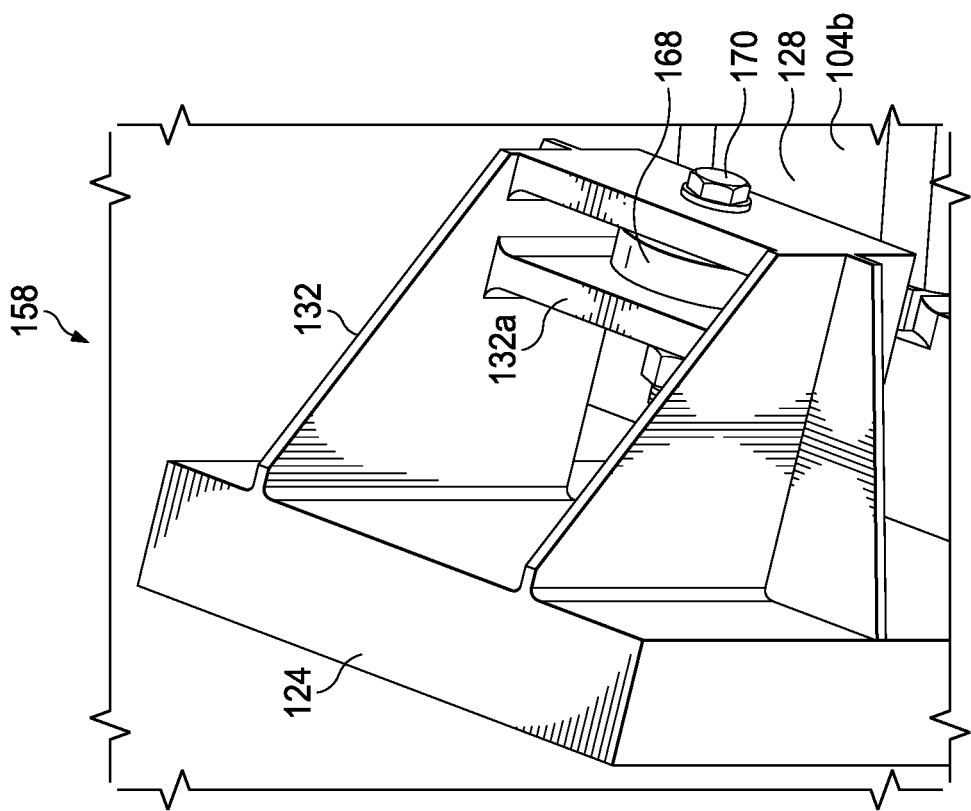
Figure 6A:
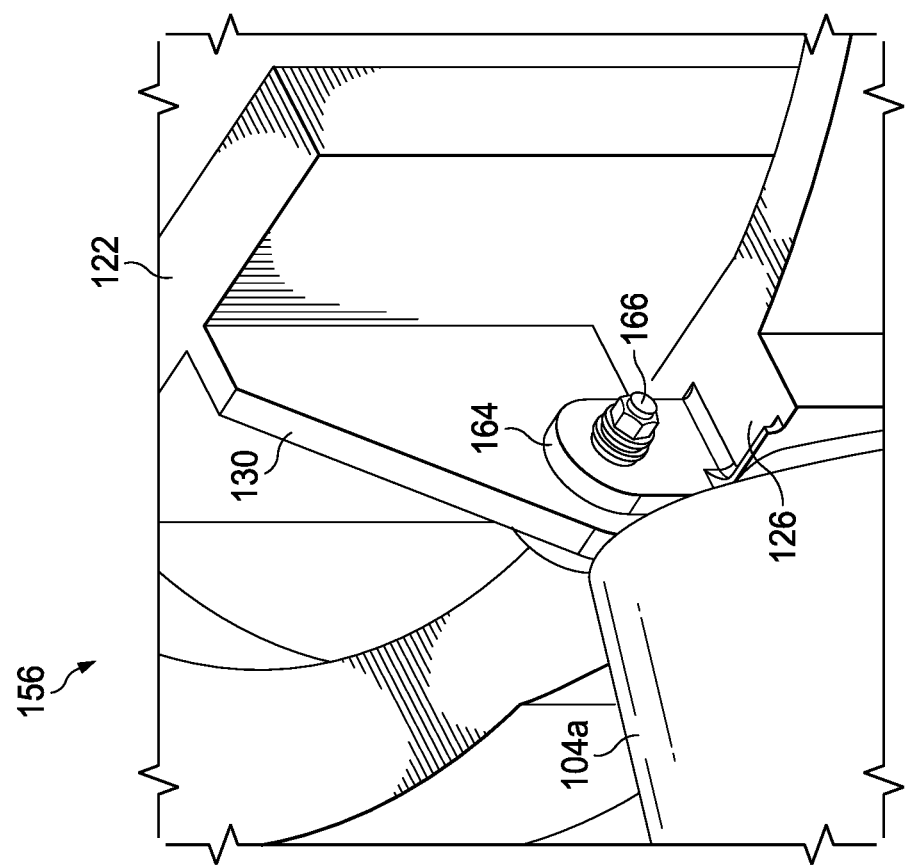

Referring to FIGS. 6A-6D in conjunction with FIGS. 5A-5F in the drawings, leading connections 156, 158 and trailing connections 160, 162 of the rapid mechanical connection interface for line replaceable centerbody assembly 110 are schematically illustrated. Connections 156, 158, 160, 162 isostatically mount line replaceable centerbody assembly 110 to stators 104a, 104b so that line replaceable centerbody assembly 110 is isolated from the primary load path of duct 102. For example, if duct 102 experiences deforming loads, such deforming loads will not be transferred through connections 156, 158, 160, 162 to line replaceable centerbody assembly 110. As shown in FIG. 6A, end stop fitting 130 projects radially outward from the leading end of rail 122. Leading mounting lug 164 projects in the leading direction from end cap 126 at the proximal end of stator 104a. End stop fitting 130 is removably coupled to leading mounting lug 164 via one or more fasteners 166 to form leading connection 156 between line replaceable centerbody assembly 110 and stator 104a. A spherical bearing may be included at the interface between fastener 166 and end stop fitting 130 to constrain the movement of line replaceable centerbody assembly 110 to a desired degree of freedom at leading connection 156.

As shown in FIG. 6B, end stop fitting 132 protrudes radially outward from the leading end of support rail 124. Leading mounting lug 168 protrudes in the leading direction from end cap 128 at the proximal end of stator 104b. End stop fitting 132 forms a slot 132a through which leading mounting lug 168 is insertable. End stop fitting 132 is removably coupled to leading mounting lug 168 via one or more fasteners 170 to form leading connection 158 between line replaceable centerbody assembly 110 and stator 104b. A spherical bearing may be located at the interface between fastener 170 and leading mounting lug 168 to constrain the movement of line replaceable centerbody assembly 110 to a desired degree of freedom at leading connection 158. The spherical bearings used in leading connections 156, 158 help to ensure that no load is transferred from stators 104a, 104b to line replaceable centerbody assembly 110. Leading mounting lugs 164, 168 are on opposite sides of line replaceable centerbody assembly 110 and are orthogonally oriented relative to one another to constrain line replaceable centerbody assembly 110 along differing degrees of freedom to prevent loads from being transferred to line replaceable centerbody assembly 110. In other embodiments, leading mounting lugs 164, 168 may be parallel to one another. End stop fittings 130, 132 as well as leading mounting lugs 164, 168 may be formed and/or located relative to a centerline axis of line replaceable centerbody assembly 110 to ensure adequate blade clearance between proprotor blades 114a and duct 102.

As shown in FIG. 6C, trailing mounting lug 172 protrudes from end cap 126 at the proximal end of stator 104a in the trailing direction. Trailing mounting lug 174 protrudes radially outward from a trailing portion of support rail 122. Trailing mounting lug 174 of line replaceable centerbody assembly 110 is removably coupled to trailing mounting lug 172 via one or more links 176, one or more spherical bearings 178a, 178b and one or more fasteners 180a, 180b to form trailing connection 160 between line replaceable centerbody assembly 110 and stator 104a. As shown in FIG. 6D, trailing mounting lug 182 protrudes from end cap 128 at the proximal end of stator 104b in the trailing direction. Trailing mounting lug 184 protrudes radially outward from a trailing portion of support rail 124. Trailing mounting lug 184 of line replaceable centerbody assembly 110 is removably coupled to trailing mounting lug 182 at the proximal end of stator 104b via one or more links 186, one or more spherical bearings 188a, 188b and one or more fasteners 190a, 190b to form trailing connection 162 between line replaceable centerbody assembly 110 and stator 104b. Links 176, 186 at trailing connections 160, 162 may be adjustable to compensate for any misalignment when installing line replaceable centerbody assembly 110 in ducted propulsion assembly 100. Spherical bearings 178a, 178b, 188a, 188b constrain the movement of line replaceable centerbody assembly 110 to desired degrees of freedom to prevent loads from being transferred from stators 104a, 104b to line replaceable centerbody assembly 110. Trailing mounting lugs 172, 174, 182, 184 may be formed or located relative to the centerline axis of line replaceable centerbody assembly 110 to ensure adequate blade tip clearance between proprotor blades 114a and duct 102.

While the illustrated embodiment shows mechanical coupling interfaces between line replaceable centerbody assembly 110 and stators 104a, 104b, in other embodiments line replaceable centerbody assembly 110 may be coupled to stators 104a, 104b using electromagnetic coupling that may be engaged or disengaged using electric current remote release and coupling capabilities. Line replaceable centerbody assembly 110 may also include a rapid electrical connection interface that transmits power from one or more batteries of the aircraft to line replaceable centerbody assembly 110. In some embodiments, line replaceable centerbody assembly 110 is installed in ducted propulsion assembly 100 by being supported on a hoist or crane and lowered into the center of duct 102. The various links, spherical bearings and fasteners described in connections 156, 158, 160, 162 may then be used to secure line replaceable centerbody assembly 110 to stators 104a, 104b. In certain embodiments, connections 156, 158, 160, 162 may be configured such that no tools are required for the installation or removal of line replaceable centerbody assembly 110. After line replaceable centerbody assembly 110 is installed in ducted propulsion assembly 100, a fairing may be used to cover line replaceable centerbody assembly 110 to provide structural protection and an aerodynamic surface.

Figure 7:
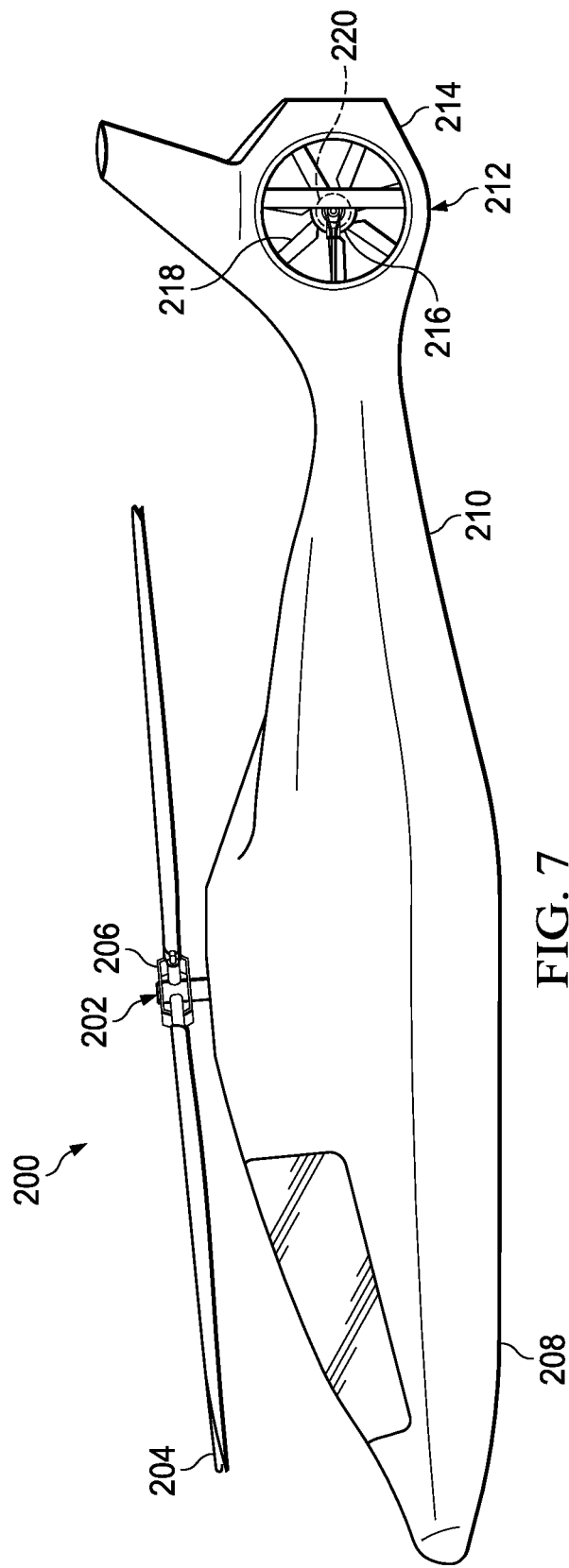
FIG. 7 is a side view of a helicopter having a ducted tail rotor utilizing a line replaceable centerbody assembly in accordance with embodiments of the present disclosure.

Referring to FIG. 7 in the drawings, a helicopter is schematically illustrated and generally designated 200. The primary propulsion assembly of helicopter 200 is a main rotor assembly 202. Main rotor assembly 202 includes a plurality of rotor blades 204 extending radially outward from a main rotor hub 206. Main rotor assembly 202 is coupled to a fuselage 208. Main rotor hub 206 is rotatable relative to fuselage 208. The pitch of rotor blades 204 can be collectively and/or cyclically manipulated to selectively control direction, thrust and lift of helicopter 200. A retractable landing gear system may provide ground support for helicopter 200. A tailboom 210 is coupled to fuselage 208 and extends from fuselage 208 in the aft direction. An anti-torque system 212 includes a ducted tail rotor assembly 214 coupled to an aft end of tailboom 210. Anti-torque system 212 controls the yaw of helicopter 200 by counteracting the torque exerted on fuselage 208 by main rotor assembly 202. Ducted tail rotor assembly 214 includes a tail rotor hub 216 having tail rotor blades 218 emanating radially therefrom. Ducted tail rotor assembly 214 also includes a line replaceable centerbody assembly 220, which has the same or similar features as the illustrative embodiments of the line replaceable centerbody assemblies discussed herein. The use of line replaceable centerbody assembly 220 in ducted tail rotor assembly 214 is illustrative of the wide range of ducted propulsion assemblies that may utilize interchangeable line replaceable centerbody assemblies such as those discussed herein.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A ducted propulsion assembly for an aircraft, the ducted propulsion assembly comprising:
a duct;
a plurality of stators each having a proximal end and a distal end, the proximal end of each stator including an end cap having a leading mounting lug, the distal ends of the stators coupled to the duct;
a line replaceable centerbody assembly isostatically coupled to the proximal ends of the stators, the line replaceable centerbody assembly comprising one or more electric motors driving an output driveshaft, the line replaceable centerbody assembly including a plurality of support rails each having a leading end including an end stop fitting; and
a proprotor assembly interchangeably coupled to and rotatable with the output driveshaft of the line replaceable centerbody assembly, the proprotor assembly rotatable in a rotational plane to generate thrust;
wherein, the end stop fittings of the support rails are removably coupled to the leading mounting lugs of the end caps of the stators via one or more fasteners and one or more spherical bearings to form leading connections between the line replaceable centerbody assembly and the stators.

2. The ducted propulsion assembly as recited in claim 1 wherein the line replaceable centerbody assembly further comprises a gearbox interposed between the output driveshaft and the one or more electric motors, the gearbox receiving rotational energy from the one or more electric motors via a motor driveshaft.

3. The ducted propulsion assembly as recited in claim 1 wherein the line replaceable centerbody assembly further comprises a blower fan configured to cool the one or more electric motors.

4. The ducted propulsion assembly as recited in claim 3 wherein the blower fan is coaxial with the one or more electric motors and receives rotational energy from the one or more electric motors via a motor driveshaft.

5. The ducted propulsion assembly as recited in claim 1 wherein the line replaceable centerbody assembly further comprises an oil management system including a heat exchanger and an oil filter.

6. The ducted propulsion assembly as recited in claim 1 wherein the line replaceable centerbody assembly further comprises an instrumentation and controller unit including one or more controllers including a speed controller, the one or more electric motors configured to rotate at a rotational speed responsive to the speed controller.

7. The ducted propulsion assembly as recited in claim 1 wherein the line replaceable centerbody assembly further comprises a gearbox, a blower fan, a pitch actuator and a heat exchanger; and
wherein, the one or more electric motors, the gearbox, the blower fan, the pitch actuator and the heat exchanger are interposed between the support rails.

8. The ducted propulsion assembly as recited in claim 1 wherein the leading mounting lugs comprise opposing leading mounting lugs on opposite sides of the line replaceable centerbody assembly, the opposing leading mounting lugs orthogonally oriented relative to one another.

9. The ducted propulsion assembly as recited in claim 1 wherein the end caps each have a trailing mounting lug;
wherein, the support rails have trailing portions including trailing mounting lugs; and
wherein, the trailing mounting lugs of the support rails are removably coupled to the trailing mounting lugs of the end caps of the stators via one or more links and one or more spherical bearings to form trailing connections between the line replaceable centerbody assembly and the stators.

10. The ducted propulsion assembly as recited in claim 1 wherein the proprotor assembly comprises a plurality of proprotor blades having variable pitch; and
wherein, the line replaceable centerbody assembly further comprises a pitch actuator configured to couple to the proprotor blades and control the pitch of the proprotor blades.

11. The ducted propulsion assembly as recited in claim 1 wherein the proximal ends of the stators include interconnected end caps forming a cylindrical centerbody support frame, the line replaceable centerbody assembly interchangeably coupled to the proximal ends of the stators via the centerbody support frame.

12. The ducted propulsion assembly as recited in claim 1 wherein the one or more electric motors comprise a stacked motor assembly including a plurality of electric motors.

13. An aircraft comprising:
a fuselage; and
a plurality of ducted propulsion assemblies rotatably coupled to the fuselage, the ducted propulsion assemblies rotatable between a generally horizontal orientation in a vertical takeoff and landing flight mode and a generally vertical orientation in a forward flight mode, each ducted propulsion assembly comprising:
a duct;
a plurality of stators each having a proximal end and a distal end, the proximal end of each stator including an end cap having a leading mounting lug, the distal ends of the stators coupled to the duct;
a line replaceable centerbody assembly isostatically coupled to the proximal ends of the stators, the line replaceable centerbody assembly comprising one or more electric motors driving an output driveshaft, the line replaceable centerbody assembly including a plurality of support rails each having a leading end including an end stop fitting; and
a proprotor assembly interchangeably coupled to and rotatable with the output driveshaft of the line replaceable centerbody assembly, the proprotor assembly rotatable in a rotational plane to generate thrust;
wherein, the end stop fittings of the support rails are removably coupled to the leading mounting lugs of the end caps of the stators via one or more fasteners and one or more spherical bearings to form leading connections between the line replaceable centerbody assembly and the stators.

14. The aircraft as recited in claim 13 wherein the stators comprise slanted stators tapering from increasing to decreasing chord length from the distal ends of the stators to the proximal ends of the stators.

15. The aircraft as recited in claim 13 wherein the line replaceable centerbody assemblies are interchangeably coupled to the stators.

16. The aircraft as recited in claim 13 further comprising one or more batteries configured to supply power to the line replaceable centerbody assemblies, wherein the line replaceable centerbody assemblies each further comprise a rapid electrical connection interface configured to transmit power from the one or more batteries.

17. A ducted propulsion assembly for an aircraft, the ducted propulsion assembly comprising:
a duct;
a plurality of stators each having a proximal end and a distal end, the proximal end of each stator including an end cap having a trailing mounting lug, the distal ends of the stators coupled to the duct;
a line replaceable centerbody assembly isostatically coupled to the proximal ends of the stators, the line replaceable centerbody assembly comprising one or more electric motors driving an output driveshaft, the line replaceable centerbody assembly including a plurality of support rails each having a trailing portion including a trailing mounting lug; and
a proprotor assembly interchangeably coupled to and rotatable with the output driveshaft of the line replaceable centerbody assembly, the proprotor assembly rotatable in a rotational plane to generate thrust;
wherein, the trailing mounting lugs of the support rails are removably coupled to the trailing mounting lugs of the end caps of the stators via one or more links and one or more spherical bearings to form trailing connections between the line replaceable centerbody assembly and the stators.

18. The ducted propulsion assembly as recited in claim 17 wherein the line replaceable centerbody assembly further comprises a gearbox, a blower fan, a pitch actuator and a heat exchanger; and
wherein, the one or more electric motors, the gearbox, the blower fan, the pitch actuator and the heat exchanger are interposed between the support rails.

19. The ducted propulsion assembly as recited in claim 17 wherein the proprotor assembly comprises a plurality of proprotor blades having variable pitch; and
wherein, the line replaceable centerbody assembly further comprises a pitch actuator configured to couple to the proprotor blades and control the pitch of the proprotor blades.

20. The ducted propulsion assembly as recited in claim 17 wherein the one or more electric motors comprise a stacked motor assembly including a plurality of electric motors.

* * * * *